(12) United States Patent
Zheng et al.

(10) Patent No.: US 12,353,830 B2
(45) Date of Patent: *Jul. 8, 2025

(54) METHOD FOR TRAINING KEYWORD EXTRACTION MODEL, KEYWORD EXTRACTION METHOD, AND COMPUTER DEVICE

(71) Applicant: Tencent Technology (Shenzhen) Company Limited, Shenzhen (CN)

(72) Inventors: Wenhao Zheng, Shenzhen (CN); Lie Kang, Shenzhen (CN); Qiang Yan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,357

(22) Filed: Feb. 29, 2024

(65) Prior Publication Data

US 2024/0202446 A1 Jun. 20, 2024

Related U.S. Application Data

(63) Continuation of application No. 17/183,218, filed on Feb. 23, 2021, now Pat. No. 11,947,911, which is a (Continued)

(30) Foreign Application Priority Data

Dec. 7, 2018 (CN) .......................... 201811494250.X

(51) Int. Cl.
G06F 40/289 (2020.01)
G06F 40/284 (2020.01)
(Continued)

(52) U.S. Cl.
CPC .......... *G06F 40/289* (2020.01); *G06F 40/284* (2020.01); *G06F 40/30* (2020.01); *G06V 30/414* (2022.01)

(58) Field of Classification Search
CPC ...... G06F 40/289; G06F 40/284; G06F 40/30; G06V 30/414
See application file for complete search history.

(56) References Cited

U.S. PATENT DOCUMENTS 6,879,951 B1 * 4/2005 Kuo ........................ G10L 13/08
715/260
8,001,152 B1 * 8/2011 Solan ...................... G06F 16/36
707/791
(Continued)

FOREIGN PATENT DOCUMENTS

CN 102270244 A 12/2011
CN 107577763 A 1/2018
(Continued)

OTHER PUBLICATIONS

Li, D., Li, S., Li, W., Wang, W., & Qu, W. (Jul. 2010). A semi-supervised key phrase extraction approach: learning from title phrases through a document semantic network. In Proceedings of the ACL 2010 conference short papers (pp. 296-300). (Year: 2010).*

(Continued)

*Primary Examiner* — Bhavesh M Mehta
*Assistant Examiner* — Philip H Lam
(74) *Attorney, Agent, or Firm* — Morgan, Lewis & Bockius LLP

(57) ABSTRACT

This application provide a keyword extraction method. The method includes: performing word segmentation on a text, to obtain a plurality of candidate words; selecting, from the plurality of candidate words, a candidate word that appears in the title; determining an extraction threshold according to an attention weight of the selected candidate word relative to (Continued)

the title; and determining a keyword of the text from the candidate words according to the extraction threshold.

17 Claims, 10 Drawing Sheets

Related U.S. Application Data continuation of application No. PCT/CN2019/123057, filed on Apr. 12, 2019.

(51) Int. Cl.
*G06F 40/30* (2020.01)
*G06V 30/414* (2022.01)

(56) References Cited

U.S. PATENT DOCUMENTS

| | | | |
|---|---|---|---|
| 11,295,083 B1 * | 4/2022 | Yun | G06N 3/08 |
| 11,947,911 B2 | 4/2024 | Zheng et al. | |
| 2006/0253476 A1 * | 11/2006 | Roth | G06F 40/12 |
| 2010/0185689 A1 * | 7/2010 | Hu | G06F 40/30 |
| | | | 707/E17.108 |
| 2011/0246464 A1 | 10/2011 | Okamoto et al. | |
| 2013/0290320 A1 | 10/2013 | Zhu et al. | |
| 2014/0237356 A1 * | 8/2014 | Durga | G06F 3/0236 |
| | | | 715/256 |
| 2015/0074095 A1 * | 3/2015 | Enders | G06F 16/2477 |
| | | | 707/728 |
| 2015/0095017 A1 | 4/2015 | Mnih et al. | |
| 2017/0169008 A1 | 6/2017 | Kang | |
| 2017/0185680 A1 | 6/2017 | Tang et al. | |
| 2017/0200066 A1 * | 7/2017 | Wang | G06N 3/045 |
| 2017/0235735 A1 | 8/2017 | Ignatyev et al. | |
| 2018/0196881 A1 * | 7/2018 | Lundin | G06F 16/9535 |
| 2018/0349477 A1 * | 12/2018 | Jaech | G06F 16/9535 |
| 2018/0373704 A1 | 12/2018 | Lee et al. | |
| 2019/0019160 A1 * | 1/2019 | Champaneria | G06N 5/04 |
| 2019/0034416 A1 | 1/2019 | Al Hasan et al. | |
| 2019/0272559 A1 | 9/2019 | Lee et al. | |
| 2019/0392066 A1 * | 12/2019 | Kim | G06F 16/24578 |

FOREIGN PATENT DOCUMENTS

| | | | |
|---|---|---|---|
| CN | 107967256 A | 4/2018 | |
| CN | 108073568 A | 5/2018 | |
| CN | 108153728 A | 6/2018 | |
| CN | 108170671 A | 6/2018 | |
| CN | 108287858 A | 7/2018 | |
| CN | 108334489 A | 7/2018 | |
| CN | 108763313 A | 11/2018 | |
| CN | 110232183 A | 9/2019 | |
| WO | WO-2018086470 A1 * | 5/2018 | G06F 16/313 |

OTHER PUBLICATIONS

Wu, Y., & Zhang, J. (2018). Chinese event extraction based on attention and semantic features: a bidirectional circular neural network. Future Internet, 10(10), 95. (Year: 2018).*

Shi, H., Xie, P., Hu, Z., Zhang, M., & Xing, E. P. (2017). Towards automated ICD coding using deep learning. arXiv preprint arXiv:1711.04075.) (Year: 2017).*

Xu, S., Yang, S., & Lau, F. (Jul. 2010). Keyword extraction and headline generation using novel word features. In Proceedings of the AAAI conference on artificial intelligence (vol. 24, No. 1, pp. 1461-1466). (Year: 2010).*

Li, J., Fan, Q. N., & Zhang, K. (2007). Keyword extraction based on tf/idf for Chinese news document. Wuhan University Journal of Natural Sciences, 12(5), 917-921. (Year: 2007).*

Liu, Z., Chen, X., & Sun, M. (2012). Mining the interests of Chinese microbloggers via keyword extraction. Frontiers of Computer Science, 6, 76-87. (Year: 2012).*

Haoran Shi et al., "Towards Automated ICD Coding Using Deep Learning", 2017, 11 pgs.

Hui-fang Ma et al., "Keywords Extraction Algorithm Based on Weighted Hypergraph Random Walk", College of Computer Science and Engineering, Northwest Normal University, Jun. 2018, vol. 46, No. 6, 5 pgs.

Peng Sun et al., "The Keyword Extraction 1410-141 of Chinese Medical Web 4 IJr Page Based on WF-TF-IDF Algorithm", 2017 International Conference on Cyber-Enabled Distributed Computing and Knowledge Discovery (CyberC), Nov. 1, 2018, 3 pgs.

Tencent Technology, ISRWO, PCT/CN2019/123057, Mar. 9, 2020, 7 pgs.

Tencent Technology, IPRP, PCT/CN2019/123057, Jun. 8, 2021, 6 pgs.

Yue Wu et al., "Chinese Event Extraction Based on Attention and Semantic Features: A Bidirectional Circular Neural Network", School of Computer Engineering and Science, Sep. 26, 2018, 10 pgs.

Zhiqi Fang et al., "Hot Keyword Identification for Extracting Web Public Opinion", 5th International Conference on Pervasive Computing and Applications, IEEE, 2010, 6 pgs.

* cited by examiner

METHOD FOR TRAINING KEYWORD EXTRACTION MODEL, KEYWORD EXTRACTION METHOD, AND COMPUTER DEVICE

CROSS REFERENCE TO RELATED APPLICATIONS

This application is a continuation application of U.S. patent application Ser. No. 17/183,218, entitled "METHOD FOR TRAINING KEYWORD EXTRACTION MODEL, KEYWORD EXTRACTION METHOD, AND COMPUTER DEVICE" filed on Feb. 23, 2021, which is a continuation application of PCT Patent Application No. PCT/CN2019/123057, entitled "KEYWORD EXTRACTION MODEL TRAINING METHOD, KEYWORD EXTRACTION METHOD, AND COMPUTER DEVICE" filed on Dec. 4, 2019, which claims priority to Chinese Patent Application No. 201811494250.X, filed with the State Intellectual Property Office of the People's Republic of China on Dec. 7, 2018, and entitled "METHOD FOR TRAINING KEYWORD EXTRACTION MODEL, KEYWORD EXTRACTION METHOD AND APPARATUS, AND STORAGE MEDIUM", all of which are incorporated herein by reference in their entirety.

FIELD OF THE TECHNOLOGY

This application relates to the field of artificial intelligence, and in particular, to a method for training a keyword extraction model, a keyword extraction method, a computer device, and a storage medium.

BACKGROUND OF THE APPLICATION

Keywords are words that represent core semantics of a document. When a user enters a keyword, a search engine may return corresponding search results based on the keyword entered by the user. For example, the user may search Moments, articles, official accounts, fictions, music, emojis and the like based on the keywords.

For example, a term frequency-inverse document frequency (TF-IDF) model or a textrank model may be used for extracting keywords. The TF-IDF model extracts the keywords by calculating term weights in a text. A calculation method of a weight of a term is a term frequency multiplied by an inverse document frequency. The term frequency measures importance of the term in a current text, and the inverse document frequency measures commonness of the term. A more common term indicates that the term is less important. Therefore, a larger TF-IDF value indicates a higher possibility that the term becomes a keyword.

In the textrank model, the text is divided into several constituent units, for example, words or sentences, a graphical model is established, and important components in the text are sorted by using a voting mechanism. The keywords may be extracted only by using information of the document.

The lengths of the texts required by the foregoing two methods are relatively long. For a descriptive short text, sufficient information cannot be provided, and keywords with extremely large deviations may be generated.

In addition, a sequence-to-sequence model may alternatively be used. Keyword extraction of a text is formalized into a sequence-to-sequence model, where the text is used as input and corresponding annotated tags are used as output. However, this method needs to annotate a large quantity of data and manually preset a threshold.

SUMMARY

Embodiments of this application provide a method for training a keyword extraction model, a storage medium, and a computer device, to avoid manually annotating a large quantity of data and manually setting a threshold, so that labor costs can be effectively reduced.

The embodiments of this application further provide a keyword extraction method, a storage medium, and a computer device, to make full use of a semantic relationship between a text and a title, and resolve a problem that accurate keywords cannot be extracted from a short text of an information entity (e.g., a mini program running on WeChat platform).

The embodiments of this application provide a method for training a keyword extraction model, the keyword extraction model including an encoding model and a decoding model, and the method including:

performing word segmentation on a training text of a training information entity, to obtain a plurality of candidate words;

performing character segmentation on a training title of the training information entity corresponding to semantics of the training text, to obtain a plurality of characters;

sequentially inputting the plurality of candidate words to the encoding model, to obtain a text feature representation of each candidate word;

adjusting the text feature representation of each candidate word according to an attention weight of the candidate word; and obtaining a text feature representation of the training text according to the adjusted text feature representation of the plurality of candidate words;

inputting the text feature representation of the training text and the plurality of characters obtained by character segmentation to the decoding model, to obtain a plurality of target characters; and comparing the plurality of characters obtained by character segmentation and the plurality of target characters, and respectively adjusting an attention weight corresponding to the text feature representation of the each candidate word according to a comparison result.

The embodiments of this application further provide a non-transitory computer-readable storage medium, storing readable instructions, to cause at least one processor to perform the method for training a keyword extraction model described above.

The embodiments of this application further provide a computer device, including one or more processors and one or more memories, the one or more memories storing at least one piece of program code, the at least one piece of program code being loaded and executed by the one or more processors to implement the following operations:

performing word segmentation on a training text of a training information entity, to obtain a plurality of candidate words;

performing character segmentation on a training title of the training information entity corresponding to semantics of the training text, to obtain a plurality of characters;

sequentially inputting the plurality of candidate words to an encoding model in a keyword extraction model, to obtain a text feature representation of each candidate word;

adjusting the text feature representation of each candidate word according to an attention weight of the candidate word;

obtaining a text feature representation of the training text according to the adjusted text feature representation of the plurality of candidate words;

inputting the text feature representation of the training text and the plurality of characters obtained by character segmentation to a decoding model in the keyword extraction model, to obtain a plurality of target characters; and comparing the plurality of characters obtained by character segmentation and the plurality of target characters, and respectively adjusting an attention weight corresponding to the text feature representation of the each candidate word according to a comparison result.

The method for training a keyword extraction model provided by some embodiments of this application does not need to manually annotate a large quantity of data on the one hand, and can effectively reduce labor costs. On the other hand, because the text and the title have the same semantics, and the method for training a keyword extraction model uses a semantic relationship between the text and the title, accuracy of keyword extraction is improved.

The embodiments of this application further provide a keyword extraction method performed at a computer device, the method including:

receiving an information entity, the information entity including a title and a text;

performing word segmentation on the text, to obtain a plurality of candidate words;

performing character segmentation on the title corresponding to semantics of the text, to obtain a plurality of characters;

sequentially inputting the plurality of candidate words to a keyword extraction model, to obtain an attention weight of each of the plurality of candidate words, the attention weight being used for representing a degree of semantic association between a candidate word at each moment and each character;

selecting, from the plurality of candidate words, a candidate word that appears in the title;

determining an extraction threshold according to an attention weight of the selected candidate word relative to each of the plurality of characters; and determining a keyword of the text of the information entity from the candidate words according to the extraction threshold.

The embodiments of this application further provide a non-transitory computer-readable storage medium, storing readable instructions, to cause at least one processor to perform the keyword extraction method described above.

The embodiments of this application further provide a computer device, including one or more processors and one or more memories, the one or more memories storing at least one piece of program code, the at least one piece of program code being loaded and executed by the one or more processors to implement the following operations:

receiving an information entity, the information entity including a title and a text;

performing word segmentation on the text, to obtain a plurality of candidate words;

performing character segmentation on the title corresponding to semantics of the text, to obtain a plurality of characters;

sequentially inputting the plurality of candidate words to a keyword extraction model, to obtain an attention weight of each candidate word relative to each character, the attention weight being used for representing a degree of semantic association between the candidate word and the character;

selecting, from the plurality of candidate words, a candidate word that appears in the title;

determining an extraction threshold according to an attention weight of the selected candidate word relative to each of the plurality of characters; and determining a keyword of the text of the information entity from the candidate words according to the extraction threshold.

The keyword extraction method provided by the embodiments of this application makes full use of a semantic relationship between a text and a title of an information entity (e.g., a mini program running on WeChat platform), and can extract accurate keywords even from a short text. On the other hand, the keyword extraction method for the text does not need to manually set a threshold and manually annotate data, can adaptively adjust a threshold for extracting keywords according to different texts and titles, thereby having relatively good generalization performance, and can provide services for many search scenarios, thereby improving search experience of a user.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other drawings from these accompanying drawings without creative efforts. In the drawings.

DESCRIPTION OF EMBODIMENTS

Technical solutions in embodiments of this application are described below with reference to the accompanying drawings in the embodiments of this application.

For brief and intuitive description, the solutions of this application are illustrated below by describing several typical embodiments. A large number of details in the embodiments are only used to help understand the solutions of this application. However, obviously, implementation of the technical solutions of this application is not limited to these details. To avoid unnecessarily obscuring the solutions of this application, some implementations are not described in detail, but only frames are provided. In the following description, "include" refers to "include, but is not limited to", and "according to . . . " refers to "at least according to . . . , but not limited to only according to . . . ". A number of elements is not particularly specified in the following descriptions, it means that there may be one or more elements, or it may be understood that there is at least one element.

The embodiments of this application provide a method for training a keyword extraction model and a keyword extraction method. The method according to the embodiments of this application gives different attention weights to candidate words obtained by text segmentation by using a semantic relationship between a text and a title. The attention weight represents a degree of semantic association between the candidate word and each character in the title. Therefore, a threshold can be adaptively adjusted without manually setting the threshold and manually annotating data, and an accurate keyword may also be extracted from a short text.

The method for training a keyword extraction model provided in the embodiments of this application may be performed by any computer device having a data processing capability, for example, a terminal device or a server.

Figure 1:
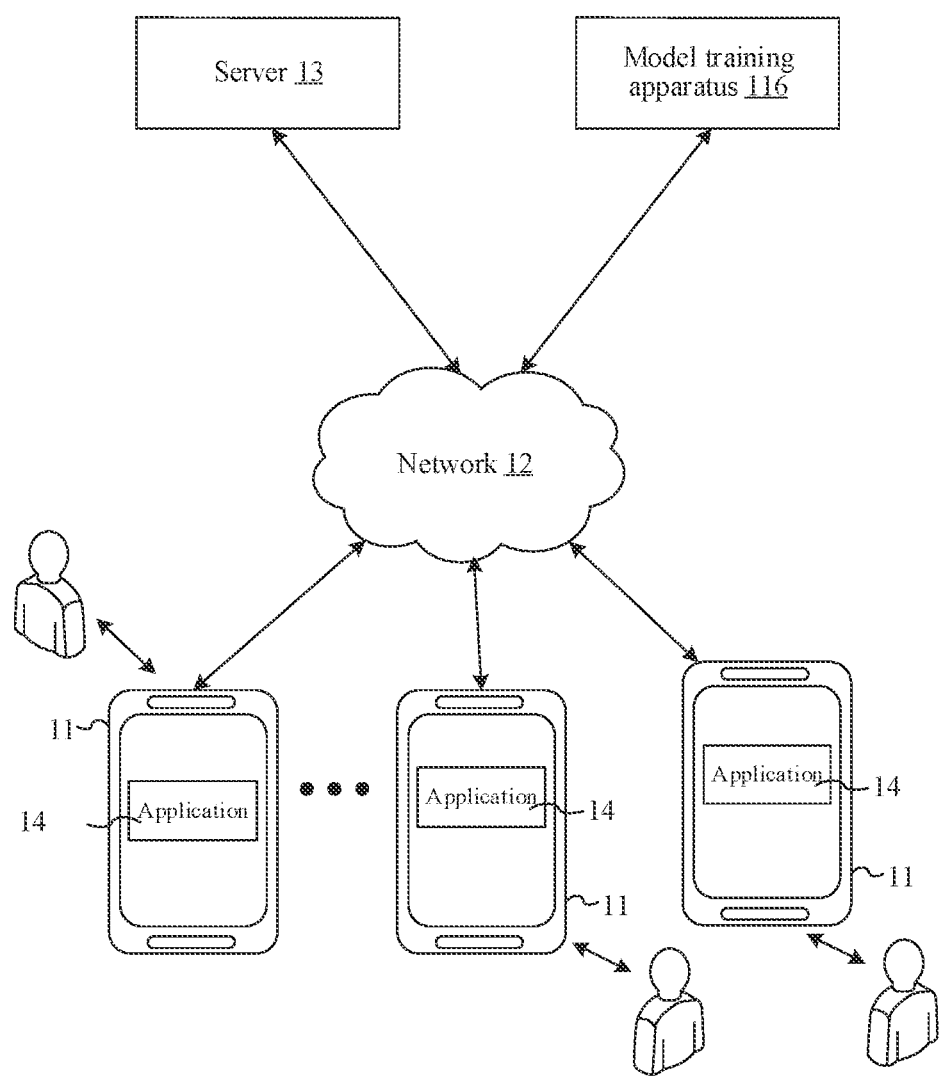
FIG. 1 is a schematic structural diagram of an application scenario according to some embodiments of this application.

FIG. 1 is a schematic diagram of an application scenario 100 according to some embodiments of this application. As shown in FIG. 1, the method for training a keyword extraction model in the embodiments of this application may be performed by a model training apparatus 116.

In some embodiments, the model training apparatus 116 may be implemented on one or more independent data processing apparatuses or distributed computer networks, or may be integrated in the server 13 or the terminal device 11.

In some embodiments, the model training apparatus 116 is configured to train a keyword extraction model to obtain a trained keyword extraction model, and provide the trained keyword extraction model to the server 13, so that the server 13 provides a search service based on the keyword extraction model for the terminal device 11, for example, providing a mini program search service, an official account search service, an emoji search service or the like for a user.

In some embodiments of this application, the terminal device 11 may be a smart terminal device such as a personal computer (PC) or a notebook computer, or may be a smart mobile terminal device such as a smartphone or a tablet computer.

In some embodiments of this application, the terminal device 11 may be connected to the server 13 by using an application program 14 and a network 12. The terminal device 11 may transmit a search term entered by a user to the server 13 by using the application program 14, so that the server 13 compares the search term entered by the user with a stored anchor text. When the search term entered by the user includes any anchor text, a search result corresponding to the anchor text is displayed, for example, a mini program, an official account or an emoji.

The network 12 may be a wireless network or a wired network. As shown in FIG. 1, on a side of an access network, the terminal device 11 may access the network 12 in a wired or wireless manner. However, on a side of a core network, the server 13 usually accesses the network 12 in a wired manner. Certainly, the server 13 may alternatively be connected to the network 12 in a wireless manner.

The server 13 is configured to extract a text and a keyword in a title corresponding to the text, and use the keyword as an anchor text of the text; and receive a search term entered by a user, compare the search term entered by the user with a stored anchor text, and when the search term of the user is determined to hit an anchor text, return content corresponding to the anchor text to the terminal device 11, to cause the terminal device to display the content corresponding to the anchor text. The text may be a description text of a mini program, an official account or an emoji. The anchor text is used for describing content of a page being pointed to. For example, when the page is a mini program, the anchor text is used for describing content of the mini program.

Figure 2:
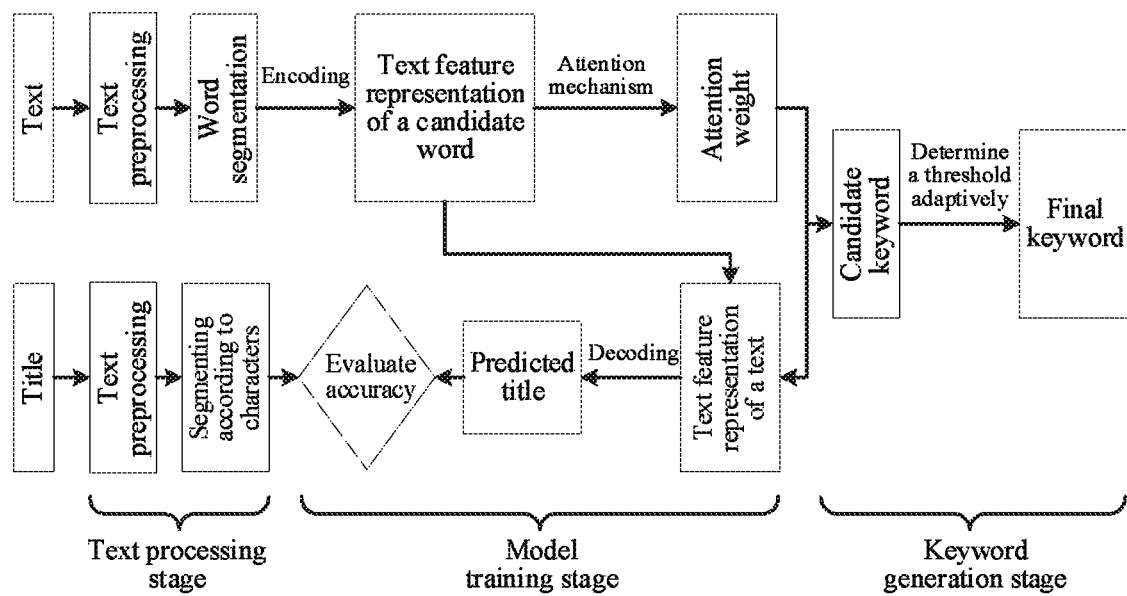
FIG. 2 is a framework diagram of a method for training a keyword extraction model and a keyword extraction method according to some embodiments of this application.

FIG. 2 is a framework diagram of a method for training a keyword extraction model and a keyword extraction method according to embodiments of this application. As shown in FIG. 2, the method for training a keyword extraction model and the keyword extraction method according to the embodiments of this application include three stages: a text processing stage, a model training stage and a keyword generation stage.

In the embodiments of this application, the keyword extraction model may be an encoding-decoding model based on an attention mechanism, including an encoding model and a decoding model. The encoding model encodes a text into a text feature representation, and the text feature representation is transmitted as an input to the decoding model to obtain a target sequence (that is, a keyword).

In the embodiments of this application, the problem of needing to manually annotate a large quantity of data is resolved by using a feature that the text and a title have the same semantics (that is, the semantics of the text corresponds to the semantics of the title).

In the text processing stage, the text and the title with the same semantics as the text are respectively preprocessed (for example, special symbol processing, English case conversion and unification of traditional and simplified Chinese characters), then word segmentation is performed on the preprocessed text to obtain a plurality of candidate words, and the preprocessed title is segmented according to character granularity to obtain a plurality of characters.

In the model training stage, the plurality of candidate words are inputted to the encoding model to obtain text feature representations of the plurality of candidate words. The attention mechanism is used for obtaining an attention weight of each candidate word relative to each character according to the text feature representations of the plurality of candidate words. The text feature representations of the plurality of candidate words are adjusted according to the attention weight of the each candidate word relative to the each character, to obtain the text feature representation of the text. The text feature representation of the text and the plurality of characters obtained by character segmentation are sequentially inputted to the decoding model, to obtain a predicted title. The predicted title is compared with the plurality of characters obtained by character segmentation, to evaluate accuracy of prediction, and then the attention weight of the each candidate word relative to the each character is adjusted until the predicted title is consistent with the plurality of characters obtained by character segmentation.

In the keyword generation stage, the attention weight of each candidate word in the text relative to each character in the title may be obtained according to the trained keyword extraction model, and a candidate word appearing in the title is selected from all the candidate words. By using the attention weights of the candidate words, an extraction threshold is determined, and then the keyword is sifted out from the candidate words according to the determined extraction threshold.

In the embodiments of this application, a text usually includes some keywords. However, the keywords may not appear in a title. Extracting the keywords as anchor texts is crucial to improvement in search experience of the user. Therefore, in the embodiments of this application, an extraction threshold may be determined according to the attention weight of the candidate word appearing in the title, so that the extraction threshold can be adaptively determined without presetting a threshold, which has certain robustness for some texts that are not related to the title. A method for training a text keyword extraction model and a text keyword extraction method provided by the embodiments of this application are described below by using several embodiments.

Figure 3:
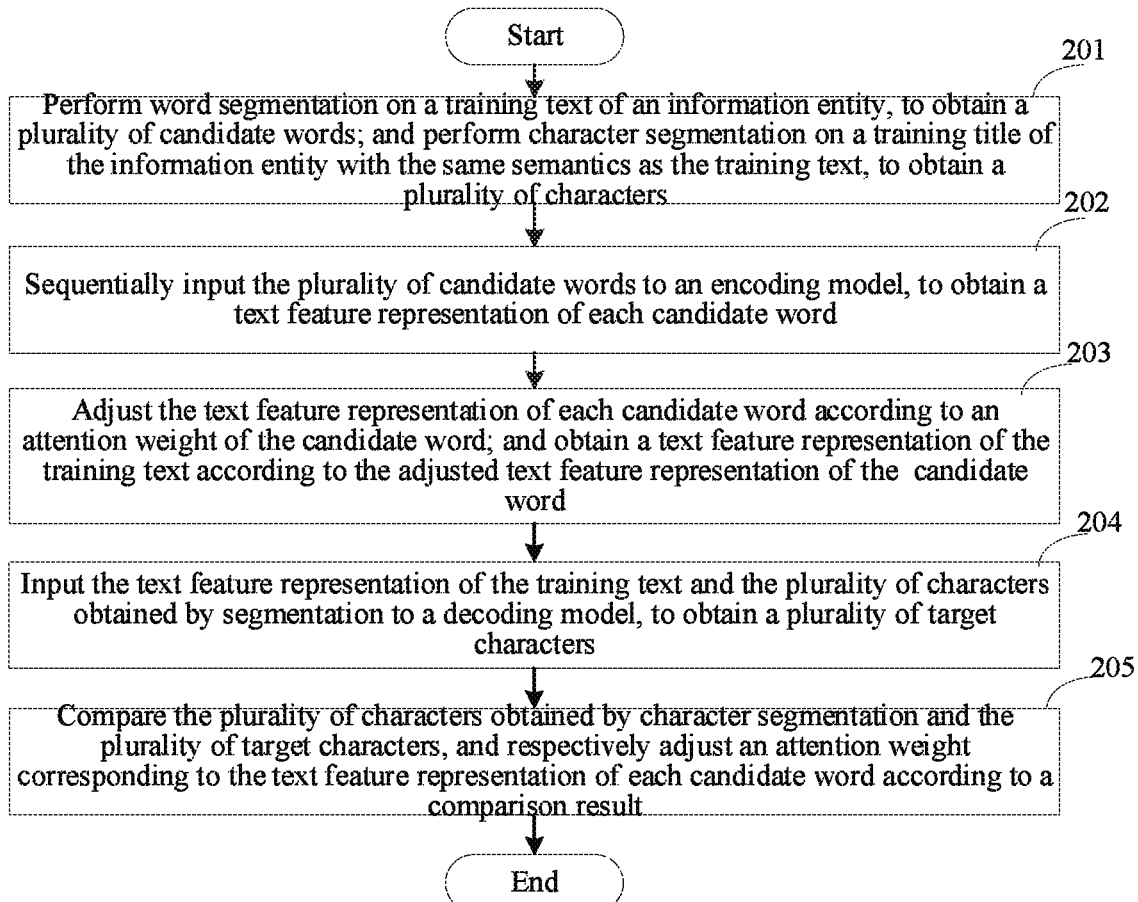
FIG. 3 is a flowchart of a method for training a keyword extraction model according to some embodiments of this application.

FIG. 3 is a flowchart of a method for training a keyword extraction model according to some embodiments of this application. The method may be performed by the model training apparatus 116 shown in FIG. 1. The keyword extraction model is based on an attention mechanism, including an encoding model and a decoding model.

As shown in FIG. 3, the method for training a keyword extraction model includes the following steps:

Step 201. The model training apparatus performs word segmentation on a training text of a training information entity, to obtain a plurality of candidate words; and performs character segmentation on a training title of the training information entity with the same semantics as the training text, to obtain a plurality of characters.

In the foregoing process, the training title with the same semantics as the training text is a training title corresponding to semantics of the training text. For example, when the training text is a description text of a mini program, the training title corresponding to semantics of the training text is a title of the mini program.

In some embodiments, the text may be a long text, or a short text. Herein, the short text means that a length of the text is relatively short, for example, a description text of a mini program, or a description text of an official account.

In some embodiments, word segmentation may be respectively performed on the training text and the training title in different word segmentation manners.

For the training text, word segmentation may be performed on the training text according to a degree of semantic association between words in the training text, to obtain the plurality of candidate words corresponding to the training text, where the degree of semantic association between the words in the training text may be also referred to as closeness of the words in the text.

For the training title, because the training title includes a relatively small quantity of words, and does not have a complete sentence structure, and may include various proper terms, the training title is segmented according to character granularity to obtain a plurality of characters corresponding to the training title.

Step 202. The model training apparatus sequentially inputs the plurality of candidate words to the encoding model, to obtain a text feature representation of each candidate word.

In some embodiments, before the plurality of candidate words are sequentially inputted to the encoding model, position information of the plurality of candidate words is determined in a preset word list, and word vectors of the plurality of candidate words are respectively obtained according to the position information of the plurality of candidate words. The word vectors of the plurality of candidate words are sequentially inputted to the encoding model, to obtain the text feature representation of each candidate word, where the word vector (word embedding) is a vector used for mapping a word or phrase from a word list to a real number.

Step 203. The model training apparatus adjusts the text feature representation of each candidate word according to an attention weight of the candidate word; and obtains a text feature representation of the training text according to the adjusted text feature representation of the candidate word.

In some embodiments, in an encoding-decoding model based on an attention mechanism, before the text feature representation obtained by encoding is inputted to the decoding model, because candidate words in the text have different impacts on a target sequence obtained by decoding, the attention weight of each candidate word relative to each character in the target sequence needs to be determined. In the model training process, continuous iterative adjustment is performed on the attention weight, so that the target sequence obtained by decoding and the training title tend to be consistent.

In some embodiments, after the attention weight of the each candidate word is obtained according to the attention mechanism, weighting is performed on the text feature representation of the each candidate word according to the attention weight of the each candidate word; and summation is performed on the weighted text feature representation of the each candidate word to obtain the text feature representation of the training text.

Step 204. The model training apparatus sequentially inputs the text feature representation of the training text and the plurality of characters obtained by character segmentation to the decoding model, to obtain a plurality of target characters.

Step 205. The model training apparatus compares the plurality of characters obtained by character segmentation and the plurality of target characters, and respectively adjusts an attention weight corresponding to the text feature representation of each candidate word according to a comparison result.

In some embodiments, errors between the plurality of characters obtained by character segmentation and the plurality of target characters may be determined, a gradient is determined according to the errors, the gradient being used for representing an update direction of the attention weight, and the attention weight corresponding to the text feature representation of the each candidate word is adjusted according to the determined gradient.

In some embodiments, in a case that the plurality of characters obtained by character segmentation are consistent with the plurality of target characters, training of the keyword extraction model may be finished. In some embodiments, in a case that a count of the iterative training reaches a count threshold, the training of the keyword extraction model may also be finished.

In some embodiments, the trained keyword extraction model establishes an association relationship between the plurality of candidate words obtained after word segmentation is performed on the text and the plurality of characters obtained after the title is segmented, the attention weight can be distributed to each candidate word according to the attention mechanism, and the attention weight distributed to the each candidate word can represent a degree of semantic association between the candidate word and each character in the title.

The method for training a keyword extraction model provided by some embodiments of this application does not need to manually annotate a large quantity of data on the one hand, and can effectively reduce labor costs. On the other hand, because the text and the title have the same semantics, the method for training a keyword extraction model uses the semantic relationship between the text and the title, and the model obtained by training can distribute an appropriate attention weight to the candidate word in the text, accuracy of keyword extraction is improved.

Figure 4:
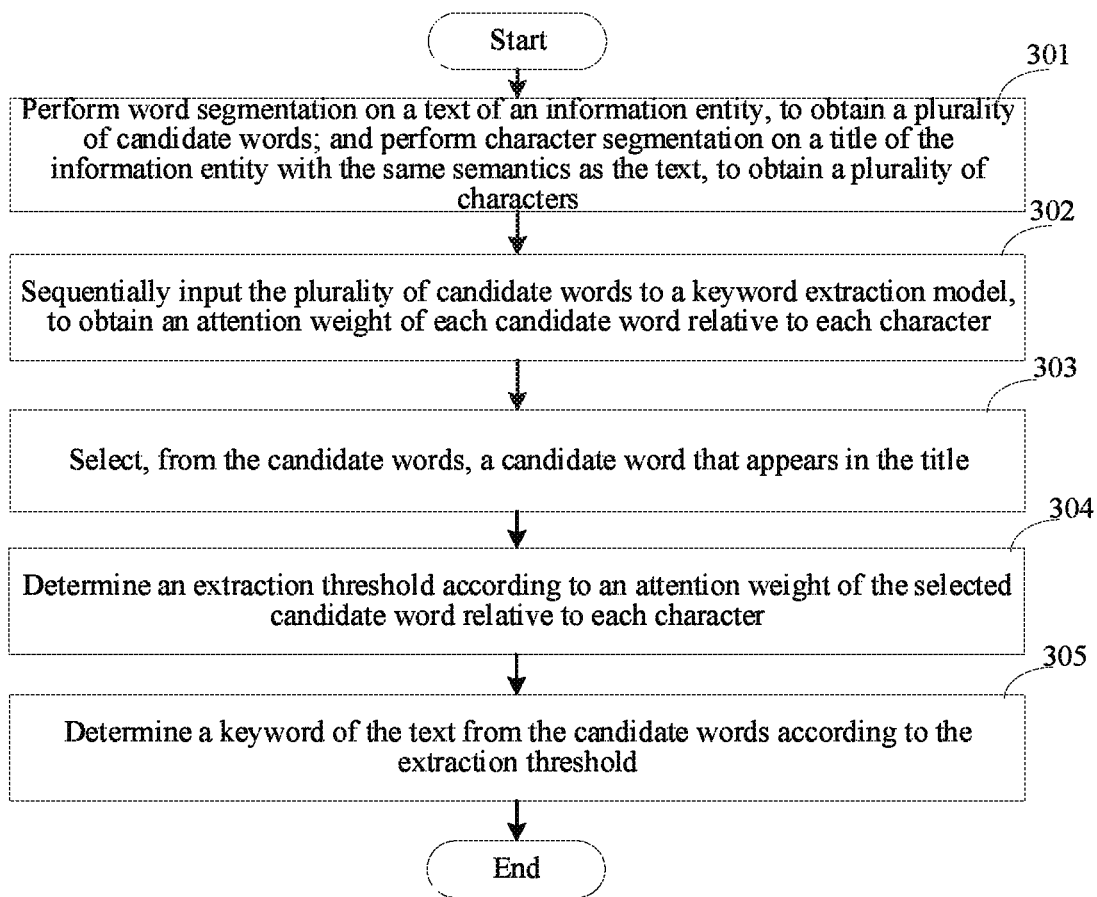
FIG. 4 is a flowchart of a keyword extraction method according to some embodiments of this application.

FIG. 4 is a flowchart of a keyword extraction method according to some embodiments of this application. The method may be performed by the server 13 shown in FIG. 1. As shown in FIG. 4, the keyword extraction method includes the following steps:

Step 301. The server performs word segmentation on a text of a received information entity, to obtain a plurality of candidate words; and performs character segmentation on a title of the received information entity with the same semantics as the text, to obtain a plurality of characters.

In the foregoing process, the title with the same semantics as the text is a title corresponding to semantics of the text. For example, when the text is a description text of a mini program, the title corresponding to semantics of the text is a title of the mini program.

In some embodiments, before the word segmentation is performed on the text and the title, the text and the title are respectively preprocessed. For example, the preprocessing includes special symbol processing, English case conversion and unification of traditional and simplified Chinese characters.

In some embodiments, word segmentation may be respectively performed on the text and the title in different word segmentation manners.

For the text, word segmentation may be performed on the text according to a degree of semantic association between words in the text, to obtain the plurality of candidate words corresponding to the text, where the degree of semantic association between the words in the text may be also referred to as closeness of the words in the text.

For the title, because the title includes a relatively small quantity of words, and does not have a complete sentence structure, and may include various proper terms, the title is segmented according to character granularity to obtain a plurality of characters corresponding to the title. If the title is also segmented by a word, and the word in the title usually appears in the text and usually appears at an initial position of the text, the model tends to use the initial word as an output without considering a semantic relationship between words in the text, and it would be difficult to complete a task of keyword extraction. Moreover, relative to the inputted text, few words in the title indicate that it is difficult for the model to capture enough information. In addition, a text usually has a complete sentence structure and is grammatical, and word segmentation is relatively simple. However, a title often has various proper terms, and is only a syntactic unit fragment, resulting in low accuracy of word segmentation.

Step 302. The server sequentially inputs the plurality of candidate words to a keyword extraction model, to obtain an attention weight of each candidate word relative to each character, the attention weight being used for representing a degree of semantic association between the candidate word and the character.

In some embodiments, the keyword extraction model may include an encoding model and a decoding model. Before the plurality of candidate words are sequentially inputted to the keyword extraction model, for each candidate word, position information of the candidate word is determined in a preset word list, and a word vector of the candidate word is respectively obtained according to the position information of the candidate word. Word vectors of the plurality of candidate words are sequentially inputted to the encoding model, to obtain a text feature representation of the each candidate word, where the word vector (word embedding) is a vector used for mapping a word or phrase from a word list to a real number.

Step 303. The server selects, from the candidate words, a candidate word that appears in the title.

In the embodiments of this application, a text usually includes some keywords. However, the keywords may not appear in a title. Extracting the keywords as anchor texts is crucial to improvement in search experience of the user. Therefore, in the embodiments of this application, an extraction threshold may be determined according to the attention weight of the candidate word appearing in the title, so that the extraction threshold can be adaptively determined.

In some embodiments, when none of the plurality of candidate words appears in the title, it indicates that the text has a low degree of semantic association with the title, and the plurality of candidate words are discarded to finish this process.

Step 304. The server determines an extraction threshold according to an attention weight of the selected candidate word relative to each character.

In some embodiments, for each selected candidate word, a weight corresponding to the candidate word is determined according to the attention weight of the candidate word relative to the each character; and the extraction threshold is determined according to the weight corresponding to the selected candidate word.

In some embodiments, because an attention weight is the attention weight of each candidate word relative to the each character, a quantity of the attention weights of each candidate word is the same as a quantity of the characters in the title. For each candidate word selected in step 303, a maximum attention weight among the attention weights of the candidate word relative to the each character is used as the weight corresponding to the candidate word.

In some embodiments, for each candidate word selected in step 303, an average value or a median of the attention weights of the candidate word relative to each character may also be used as the weight corresponding to the candidate word.

After the corresponding weight is selected for each candidate word selected in step 303, the extraction threshold may be determined according to a maximum weight among the weights corresponding to the selected candidate words.

Step 305. The server determines a keyword of the text of the information entity from the candidate words according to the extraction threshold.

In some embodiments, for each candidate word in the candidate words, in a case that the weight corresponding to the candidate word is greater than the extraction threshold, the candidate word is used as the keyword of the text.

Some embodiments of this application provide a text keyword extraction method. On the one hand, a semantic relationship between a text and a title is used, so that an extracted keyword can reflect core semantics of the text. On the other hand, the keyword extraction method for the text does not need to manually set a threshold, can adaptively adjust a threshold for extracting keywords according to different texts and titles, thereby having relatively good generalization performance, and can provide services for many search scenarios, thereby improving search experience of a user.

Figure 5:
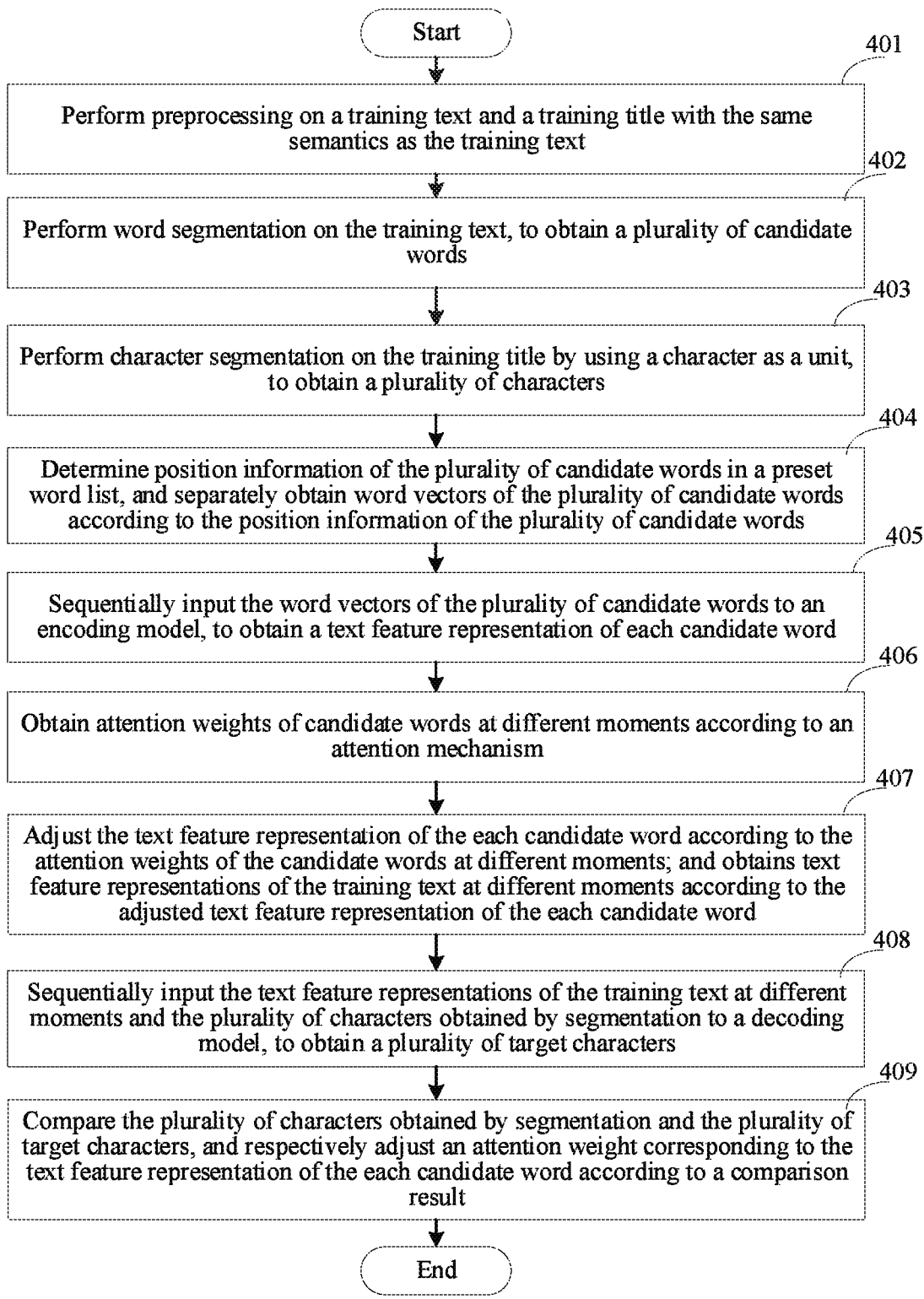
FIG. 5 is a flowchart of a method for training a keyword extraction model according to some embodiments of this application.

With reference to accompanying drawings, the following describes a method for training a keyword extraction model according to some embodiments of this application by using an example in which the text is a short text. FIG. 5 is a flowchart of a method for training a keyword extraction model according to some embodiments of this application. The method may be performed by the model training apparatus 116 shown in FIG. 1. As shown in FIG. 5, the method for training a keyword extraction model includes the following steps:

Step 401. The model training apparatus separately performs preprocessing on a training text and a training title of a training information entity with the same semantics as the training text.

In the foregoing process, the training title with the same semantics as the training text is a training title corresponding to semantics of the training text. For example, when the training text is a description text of a mini program, the training title corresponding to semantics of the training text is a title of the mini program.

In some embodiments, the preprocessing includes special symbol processing, English case conversion and unification of traditional and simplified Chinese characters. For example, uppercase English letters in the training text and the training title are converted into lowercase English letters.

Step 402. The model training apparatus performs word segmentation on the training text, to obtain a plurality of candidate words.

In some embodiments, the word segmentation is performed on the training text according to a degree of semantic association between words in the training text, to obtain the plurality of candidate words corresponding to the training text, where the degree of semantic association between the words in the training text may be also referred to as closeness of the words in the text.

For example, if the training text is "招商银行分行遍布北京、上海、杭州等", the word segmentation may be performed on the text to obtain a plurality of corresponding candidate words "招商","银行","分行", "遍布","北京","上海","杭州" and "等".

Step 403. The model training apparatus performs character segmentation on the training title by using a character as a unit, to obtain a plurality of characters.

In some embodiments, according to an aspect, if the training title is also segmented by a word, and the word in the training title usually appears in the training text and usually appears at an initial position of the training text, the keyword extraction model tends to use the initial word as an output without considering a semantic relationship between words in the training text, and it would be difficult to complete a task of keyword generation. According to another aspect, relative to the inputted training text, few words in the training title indicate that it is difficult for the keyword extraction model to capture enough information. According to still another aspect, the training text usually has a complete sentence structure and is grammatical, and word segmentation is relatively simple. However, the training title often has various proper terms, and is only a syntactic unit fragment, resulting in low accuracy of word segmentation. Therefore, the training title is segmented according to character granularity to obtain the plurality of characters corresponding to the training title.

For example, the training title "招商银行" is segmented according to character granularity to obtain the plurality of corresponding characters "招","商","银" and "行".

Step 404. The model training apparatus determines position information of the plurality of candidate words in a preset word list, and separately obtains word vectors of the plurality of candidate words according to the position information of the plurality of candidate words.

In some embodiments, the preset word list refers to a word list established for all words that have appeared in the title, so that the position information of any word may be found according to the word list. The word vector (word embedding) is a vector used for mapping a word or phrase from a word list to a real number.

In the foregoing process, the position information of each candidate word and the word vector of each candidate word may be stored correspondingly, so that after the position information of the each candidate word is queried in the word list, each word vector corresponding to each piece of position information is obtained by querying in a database according to a mapping relationship between the position information and the word vector.

Step 405. The model training apparatus sequentially inputs the word vectors of the plurality of candidate words to the encoding model, to obtain a text feature representation of each candidate word.

In some embodiments, the encoding model may be formed by L layers of long short-term memory (LSTM) units, and the decoding model may be formed by L layers of LSTM units.

Alternatively, the encoding model and the decoding model may be implemented in other manners, for example, a gated recurrent unit (GRU).

Figure 6:
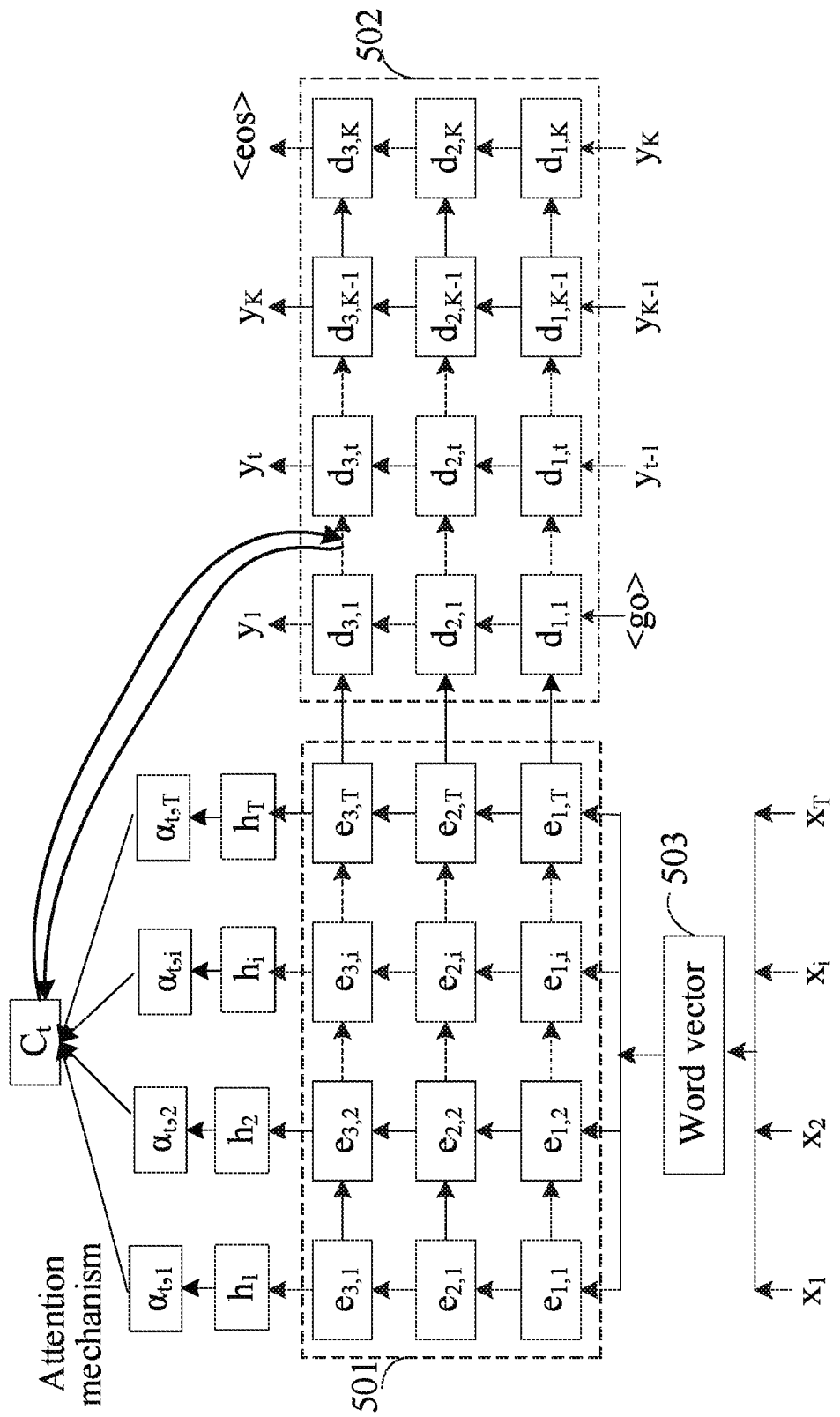
FIG. 6 is a schematic structural diagram of a keyword extraction model according to some embodiments of this application.

FIG. 6 is a schematic structural diagram of a keyword extraction model according to the embodiments of this application. As shown in FIG. 6, the keyword extraction model is formed by an encoding model 501 and a decoding model 502. $x_1$ to $x_T$ are a plurality of candidate words obtained after word segmentation is performed on a text, and T is a quantity of the candidate words from $x_1$ to $x_T$. The position information of the plurality of candidate words is determined in the preset word list, and the word vectors 503 corresponding to the plurality of candidate words are respectively obtained according to the position information of the plurality of candidate words. A quantity of the word vectors 503 is the quantity of the plurality of candidate words, and the word vectors 503 corresponding to the plurality of candidate words are sequentially inputted to the encoding model 501.

As shown in FIG. 6, the encoding model 501 includes three layers of LSTM units. First, a word vector of $x_1$ is inputted to an LSTM unit $e_{1,1}$ at a first moment, and then an output of the LSTM unit $e_{1,1}$ and a word vector of a candidate word $x_2$ are used at a second moment as an input of an LSTM unit $e_{1,2}$, and so on, until at a $T^{th}$ moment, an output of an LSTM unit $e_{1,T-1}$ and a word vector of a candidate word $x_{T-1}$ are inputted to an LSTM unit $e_{1,T}$ to complete encoding of a first layer of LSTM units of the encoding model 501; and then the output of the LSTM unit $e_{1,1}$ is used as an input of an LSTM unit $e_{2,1}$, and then an output of the LSTM unit $e_{2,1}$ and an output of an LSTM unit $e_{1,2}$ are used as an input of an LSTM unit $e_{2,2}$, and so on, until an LSTM unit $e_{2,T}$ completes encoding of a second layer of LSTM units of the encoding model 501. The rest can be deduced by analogy, and the encoding model 501 completes the encoding of the three layers of LSTM units to obtain the text feature representation of each candidate word. A vector outputted by an LSTM unit $e_{3,1}$ is a text feature representation $h_1$ of the candidate word $x_1$, a vector outputted by an LSTM unit $e_{3,2}$ is a text feature representation $h_2$ of the candidate word $x_2$, and a vector outputted by an LSTM unit $e_{3,i}$ is a text feature representation $h_i$ of the candidate word $x_i$. The rest can be deduced by analogy, and a vector outputted by an LSTM unit $e_{3,T}$ is a text feature representation $h_T$ of the candidate word $x_T$, where $1 \leq i \leq T$.

Furthermore, T text feature representations from $h_1$ to $h_T$ outputted from the LSTM unit $e_{3,1}$ to the LSTM unit $e_{3,T}$ are T vectors, and the T vectors may form a text feature matrix, that is, the text feature matrix is formed by the T word vectors. Dimensions of the T vectors outputted from the LSTM unit $e_{3,1}$ to the LSTM unit $e_{3,T}$ may be the same as or different from dimensions of the word vectors of the T candidate words.

It may be seen from the encoding process of the encoding model that, in the encoding process, the encoding model formed by the LSTM units not only considers information of the candidate word inputted at a current moment, but also considers an output of the previous LSTM unit, that is, considers information of the candidate word inputted at a previous moment. Therefore, each text feature representation outputted by the encoding model can reflect core semantics of the text.

Step 406. The model training apparatus obtains attention weights of candidate words at different moments according to an attention mechanism.

In some embodiments, the attention weight is used for representing a degree of semantic association between each candidate word and each character. FIG. 6 is still used as an example. Text feature representations $h_i$ of T candidate words from $x_1$ to $x_T$ are outputted by the encoding model 501, and attention weights $\alpha_{t1}, \alpha_{t2}, \ldots, \alpha_{ti}, \ldots, \alpha_{tT}$ of T candidate words at different moments are obtained according to the attention mechanism, where $\alpha_{ti}$ is an attention distribution probability assigned to each candidate word and a character $y_t'$ in the title according to the attention mechanism when a character $y_t$ is predicted at a $t^{th}$ moment, and indicates a degree of semantic association between an $i^{th}$ candidate word $x_i$ and the character $y_t'$ in the title when the character $y_t$ is predicted at the $t^{th}$ moment. The predicted character $y_t$ corresponds to the character $y_t'$ in the title, where t is a positive integer, $1 \leq t \leq K$, and K is a quantity of the plurality of characters obtained after the title is segmented.

Step 407. The model training apparatus adjusts the text feature representation of the each candidate word according to the attention weights of the candidate words at different moments; and obtains text feature representations of the training text at different moments according to the adjusted text feature representation of the each candidate word.

In some embodiments, after the attention weights of the candidate words at different moments are obtained according to the attention mechanism, weighting is performed on the text feature representation of the each candidate word according to the attention weights of the candidate words at different moments; and summation is performed on the weighted text feature representation of the each candidate word to obtain the text feature representations of the training text at different moments, that is, obtain context vectors of the text at different moments, and the context vectors can represent intermediate semantics of the text.

Specifically, FIG. 6 is still used as an example. After the attention weights $\alpha_{t1}, \alpha_{t2}, \ldots, \alpha_{ti}, \ldots, \alpha_{tT}$ of T candidate words at different moments are obtained, weighted summation is performed on the text feature representation $h_i$ of the each candidate word according to the attention weights $\alpha_{t1}, \alpha_{t2}, \ldots, \alpha_{ti}, \ldots, \alpha_{tT}$ of the T candidate words at different moments, to obtain the text feature representations of the text at different moments, that is, obtain a context vector of the text at the $t^{th}$ moment. A specific formula (1) is as follows:

$$C_t = \sum_{i=1}^{T} \alpha_{ti} h_i \tag{1}$$

where $\alpha_{ti}\alpha_{ti}$ is an attention weight of an $i^{th}$ candidate word $x_i$ when the character $y_t$ is predicted at the $t^{th}$ moment; and $h_i$ is the text feature representation of the candidate word $x_i$, where $1 \leq i \leq T$, and $1 \leq t \leq K$.

Step 408. The model training apparatus sequentially inputs the text feature representations of the training text at different moments and the plurality of characters obtained by character segmentation to the decoding model, to obtain a plurality of target characters.

In some embodiments, the keyword extraction model further includes a decoding model. After the text feature representations of the text at different moments are obtained, the text feature representations of the training text at different moments and the plurality of characters obtained by character segmentation are sequentially inputted to the decoding model, to obtain the plurality of target characters through decoding of the decoding model.

Specifically, the text feature representations of the training text at different moments and the plurality of characters obtained by character segmentation are sequentially inputted to the decoding model, and the decoding model obtains, by performing decoding according to the text feature representation at a current moment and a character corresponding to a previous moment, the target character corresponding to the current moment.

As shown in FIG. 6, the decoding model 502 includes the three layers of LSTM units. First, at a first moment, a text feature representation $C_1$ of the text at the first moment and a preset vector are inputted to an LSTM unit $d_{1,1}$, and then at a second moment, an output of the LSTM unit $d_{1,1}$, a text feature representation $C_2$ of the text at the second moment and a first character $y_1'$ in the plurality of characters obtained by character segmentation are used as an input of an LSTM unit $d_{1,2}$. The rest can be deduced by analogy. At a $T^{th}$ moment, an output of the LSTM unit $d_{1,t-1}$, a text feature representation $Cc_{t-1}$ of the text at a $(t-1)^{th}$ moment and a $(t-1)^{th}$ character $y_{t-1}'$ in the plurality of characters obtained by character segmentation are used as an input of an LSTM unit $d_{1,t}$, until at a $K^{th}$ moment, an output of an LSTM unit $d_{1,K-1}$, a text feature representation $C_K$ of the text at the $K^{th}$ moment and a $K^{th}$ character $y_K'$ in the plurality of characters obtained by character segmentation are inputted to an LSTM unit $e_{1,K}$, the $K^{th}$ character being followed by a preset end character, for example, cos. The decoding of the first layer of LSTM units of the decoding model 502 is not completed until the end character cos is encountered; then the output of the LSTM unit $d_{1,1}$ is used as an input of an LSTM unit $d_{2,1}$, and then an output of the LSTM unit $d_{2,1}$ and an output of an LSTM unit $d_{1,2}$ are used as an input of an LSTM unit $d_{2,2}$, until an LSTM unit $d_{2,K}$ completes the decoding of the second layer of LSTM units of the decoding model 502. The rest can be deduced by analogy. The decoding model 502 completes the decoding of the three layers of LSTM units to obtain the K target characters from $y_1$ to $y_k$ through decoding.

Step 409. The model training apparatus compares the plurality of characters obtained by character segmentation and the plurality of target characters, and respectively adjusts an attention weight corresponding to the text feature representation of the each candidate word according to a comparison result.

In some embodiments, the plurality of characters obtained by character segmentation and the plurality of target characters are compared to obtain corresponding errors, and a gradient is determined according to the obtained errors, the gradient being used for representing an update direction of the attention weight. The attention weight corresponding to the text feature representation of the each candidate word is adjusted according to the determined gradient.

Specifically, the plurality of characters $y_1'$ to $y_K'y_K'$ obtained by segmentation are compared with the target characters from $y_1$ to $y_K$ obtained through decoding. According to the errors obtained from a comparison result, the gradient representing the update direction of the attention weight is determined, and the attention weights $\alpha_{t1}$, $\alpha_{t2}$, . . . , $\alpha_{ti}$, . . . $\alpha_{tT}$ corresponding to the text feature representation from $h_1$ to $h_T$ of the candidate words from $x_1$ to $x_T$ are adjusted according to the gradient. The training of the keyword extraction model is not stopped until the plurality of characters $y_1'$ to $y_K'y_K'$ obtained by segmentation are consistent with the target characters from $y_1$ to $y_K$ obtained through decoding.

In some embodiments, the trained keyword extraction model establishes an association relationship between the plurality of candidate words obtained after word segmentation is performed on the text and the plurality of characters obtained after the title is segmented, the attention weight can be distributed to each candidate word according to the attention mechanism, and the attention weight distributed to the each candidate word can represent a degree of semantic association between the candidate word and each character in the title. When the attention weight of a candidate word relative to a character is greater, it indicates that the degree of semantic association between the candidate word and the character is stronger, that is, closeness of the candidate word and the character is higher.

According to the foregoing technical solution, on the one hand, there is no need to manually annotate a large quantity of data sets, thereby effectively reducing labor costs. On the other hand, because the text and the title have the same core semantics, the method for training a keyword extraction model uses structure information of the text and the title, and the model obtained by training can distribute an appropriate attention weight to the candidate word in the text, accuracy of keyword extraction is improved.

With reference to accompanying drawings, the following describes a keyword extraction method according to some embodiments of this application by using an example in which the text is a short text.

Figure 7:
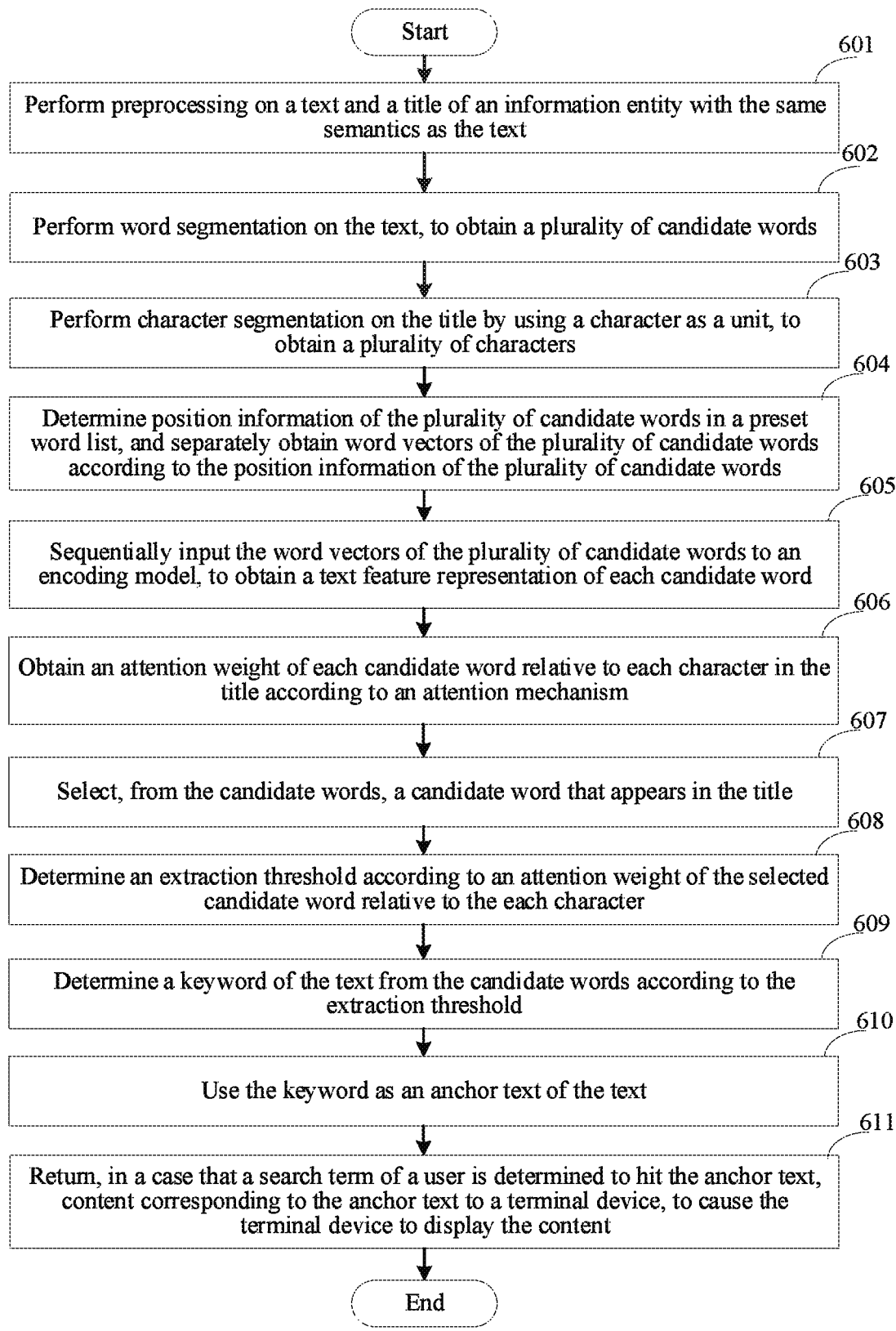
FIG. 7 is a flowchart of a keyword extraction method according to some embodiments of this application.

FIG. 7 is a flowchart of a keyword extraction method according to some embodiments of this application. The method may be performed by the server 13 shown in FIG. 1. As shown in FIG. 7, the keyword extraction method includes the following steps:

Step 601. The server separately performs preprocessing on a text and a title of an information entity received by the server with the same semantics as the text.

In the foregoing process, the title with the same semantics as the text is a title corresponding to semantics of the text. For example, when the text is a description text of a mini program, the title corresponding to semantics of the text is a title of the mini program.

In some embodiments, the preprocessing includes special symbol processing, English case conversion and unification of traditional and simplified Chinese characters. For example, uppercase English letters in the training text and the training title are converted into lowercase English letters.

Step 602. The server performs word segmentation on the text, to obtain a plurality of candidate words.

In some embodiments, the word segmentation is performed on the text according to a degree of semantic association between words in the text, to obtain the plurality of candidate words corresponding to the text, where the degree of semantic association between the words in the text may be also referred to as closeness of the words in the text.

For example, if a short text is "招商银行分行遍布北京、上海、杭州等", and a title with the same semantics as the short text is "招商银行", the word segmentation may be performed on the short text to obtain a plurality of corresponding candidate words "招商","银行","分行","遍布"," 北京","上海","杭州" and "等".

Step 603. The server performs character segmentation on the title by using a character as a unit, to obtain a plurality of characters.

For example, the title is segmented according to character granularity to obtain the plurality of corresponding characters "招","商","银" and "行".

An implementation method of this step is similar to step 403, and details are not described herein.

Step 604. The server determines position information of the plurality of candidate words in a preset word list, and separately obtains word vectors of the plurality of candidate words according to the position information of the plurality of candidate words.

In some embodiments, the word vector (word embedding) is a vector used for mapping a word or phrase from a word list to a real number.

An implementation method of this step is similar to step 404, and details are not described herein.

Step 605. The server sequentially inputs the word vectors of the plurality of candidate words to the encoding model, to obtain a text feature representation of each candidate word.

An implementation method of this step is similar to step 405, and details are not described herein.

Step 606. The server obtains an attention weight of each candidate word relative to each character in the title according to an attention mechanism.

In some embodiments, the attention weight is used for representing a degree of semantic association between a candidate word at each moment and each character.

An implementation method of this step is similar to step 406, and details are not described herein.

Step 607. The server selects, from the candidate words, a candidate word that appears in the title.

For example, a short text is processed by word segmentation to obtain four candidate words: "杭州", "银行", "遍布" and "浙江", and a title with the same semantics as the text is "杭州银行". Therefore, it may be determined that the candidate words appearing in the title are the candidate word "杭州" and the candidate word "银行".

Step 608. The server determines an extraction threshold according to an attention weight of the selected candidate word relative to the each character.

In some embodiments, for each selected candidate word, a weight corresponding to the candidate word is determined according to the attention weight of the candidate word relative to the each character; and the extraction threshold is determined according to the weight corresponding to the selected candidate word.

In some embodiments, for the each selected candidate word, a maximum attention weight among the attention weights of the candidate words relative to the characters is used as the weight corresponding to the candidate word. Furthermore, an average value or a median of the attention weights of the candidate word relative to the each character is used as the weight corresponding to the candidate word.

In some embodiments, because an attention weight is the attention weight of the each candidate word relative to the each character, a quantity of the attention weights of each candidate word is the same as a quantity of the characters in the title. After the corresponding weight is selected for the each candidate word, the extraction threshold may be determined according to a maximum weight among the weights corresponding to the selected candidate words.

For example, a quantity of the characters in the title is K, and a maximum attention weight among K attention weights of each candidate word is used as a weight corresponding to the candidate word. Furthermore, an average value or a median of the K attention weights of the candidate word may be further used as a weight corresponding to the candidate word.

For example, a short text is processed by word segmentation to obtain four candidate words: "杭州", "银行", "遍布" and "浙江", and a title with the same semantics as the short text is "杭州银行". Therefore, only the candidate word "杭州" and the candidate word "银行" appear in the title "杭州银行". Therefore, the candidate word "杭州" and the candidate word "银行" are the selected candidate words, and an extraction threshold is determined from the candidate word "杭州" and the candidate word "银行". If weights corresponding to the four candidate words are 0.3, 0.2, 0.1 and 0.4, because a weight 0.3 corresponding to the candidate word "杭州" is greater than a weight 0.2 corresponding to the candidate word "银行", the extraction threshold is determined to be 0.3.

In some embodiments, when none of the plurality of candidate words appears in the title, it indicates that the text has a low degree of semantic association with the title, and the plurality of candidate words are discarded to finish this process.

Step 609. The server determines a keyword of the text of the information entity from the candidate words according to the extraction threshold.

In some embodiments, for each candidate word in the candidate words, in a case that the weight corresponding to the candidate word is greater than the extraction threshold, the candidate word is used as the keyword of the text.

Still using the example in step 608 as an example, the weights corresponding to the four candidate words "杭州", "银行", "遍布" and "浙江" are 0.3, 0.2, 0.1 and 0.4 respectively. According to magnitudes of the weights corresponding to the four candidate words, the four candidate words are sorted, and a sorting result of "浙江" (0.4), "杭州" (0.3), "银行" (0.2), and "遍布" (0.1) may be obtained. Because the determined extraction threshold is determined to be 0.3, it may be determined, according to the extraction threshold, that a weight corresponding to the candidate word "浙江" is greater than the extraction threshold, that is, the sorting result is that the candidate word "浙江" is in front of the candidate word "杭州" corresponding to the extraction threshold. Therefore, the candidate word "浙江" is a keyword of the text.

In some embodiments, a keyword extraction method according to some embodiments of this application may further include:

Step 610. The server uses the keyword as an anchor text of the text.

Step 611. The server returns, in a case that a search term of a user is determined to hit the anchor text, the determined text corresponding to the anchor text to a terminal device, to cause the terminal device to display the text corresponding to the anchor text.

In some embodiments, in addition to using a keyword extracted from a text as an anchor text, a title corresponding to the text is segmented to obtain keywords corresponding to the title, and each keyword corresponding to the title is also used as an anchor text. When the search term of the user is determined to hit a certain anchor text, content corresponding to the anchor text is fed back to a terminal device, to cause the terminal device to display the content. For example, the content may be a description page of a mini program or an official account.

Figure 8:
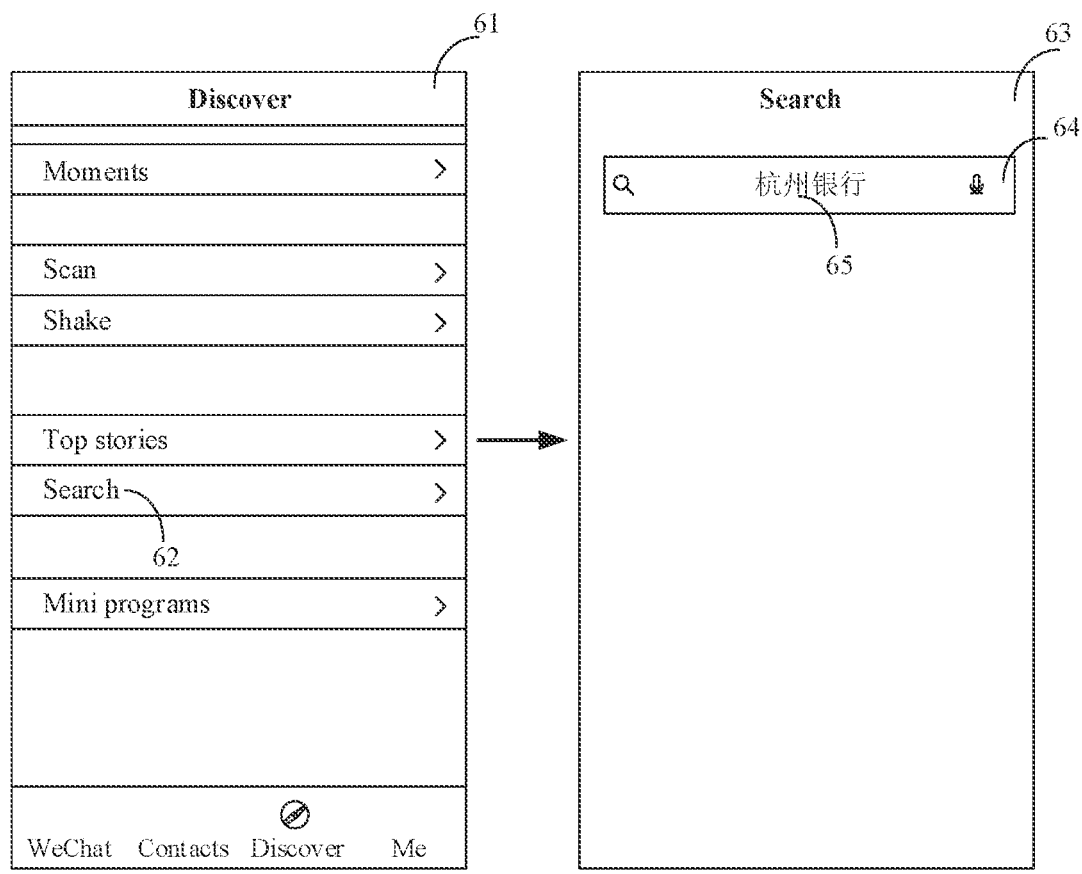
FIG. 8 is a schematic diagram of a user interface according to some embodiments of this application.

FIG. 8 is a schematic diagram of a user interface according to the embodiments of this application. As shown in FIG. 8, a user taps a control 62 "Search" in an interface 61 provided by an application program in a terminal device, the application program displays an interface 63 in response to a tapping operation of the user, and the user may enter a search term 65 in a search box 64. In FIG. 8, it is assumed that the search term 65 entered by the user is "杭州银行".

Figure 9:
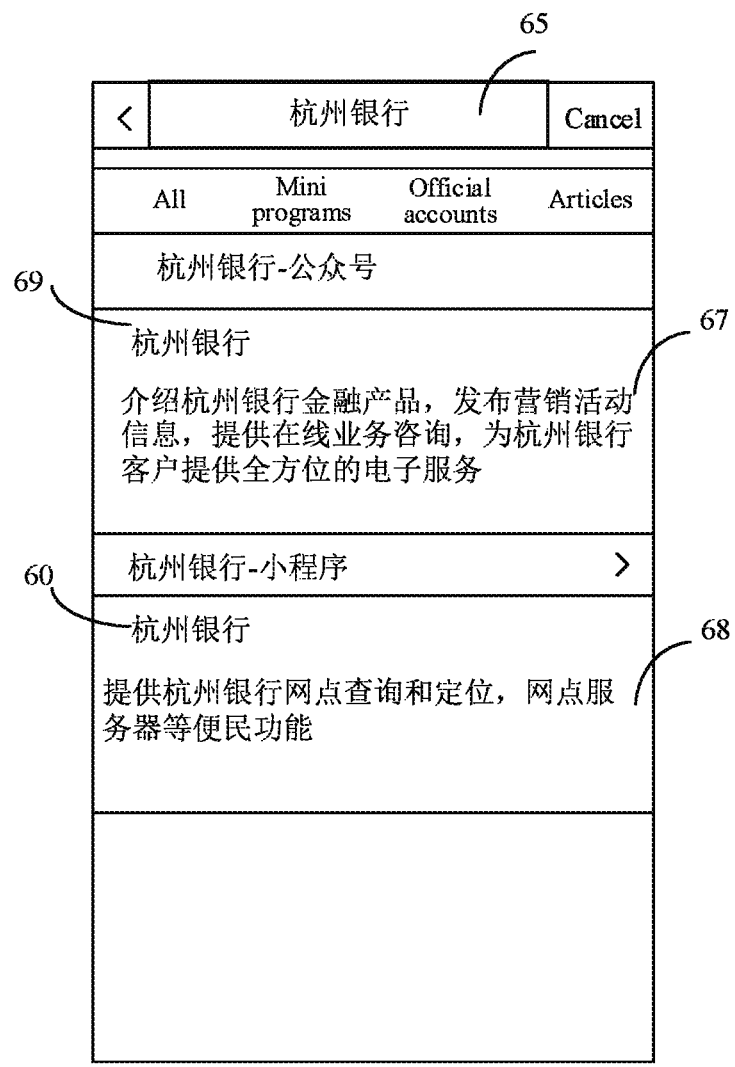
FIG. 9 is a schematic diagram of another user interface according to some embodiments of this application.

FIG. 9 is a schematic diagram of another user interface according to the embodiments of this application. As shown in FIG. 9, according to the search term "杭州银行" 65 entered by the user, the terminal device displays two search results, one is an official account of "杭州银行", including a title 69 and a description text 67 that are of the official account, and the other is a mini program of "杭州银行", including a title 60 and a description text 68 that are of the mini program, thereby greatly improving search experience of the user.

Figure 10:
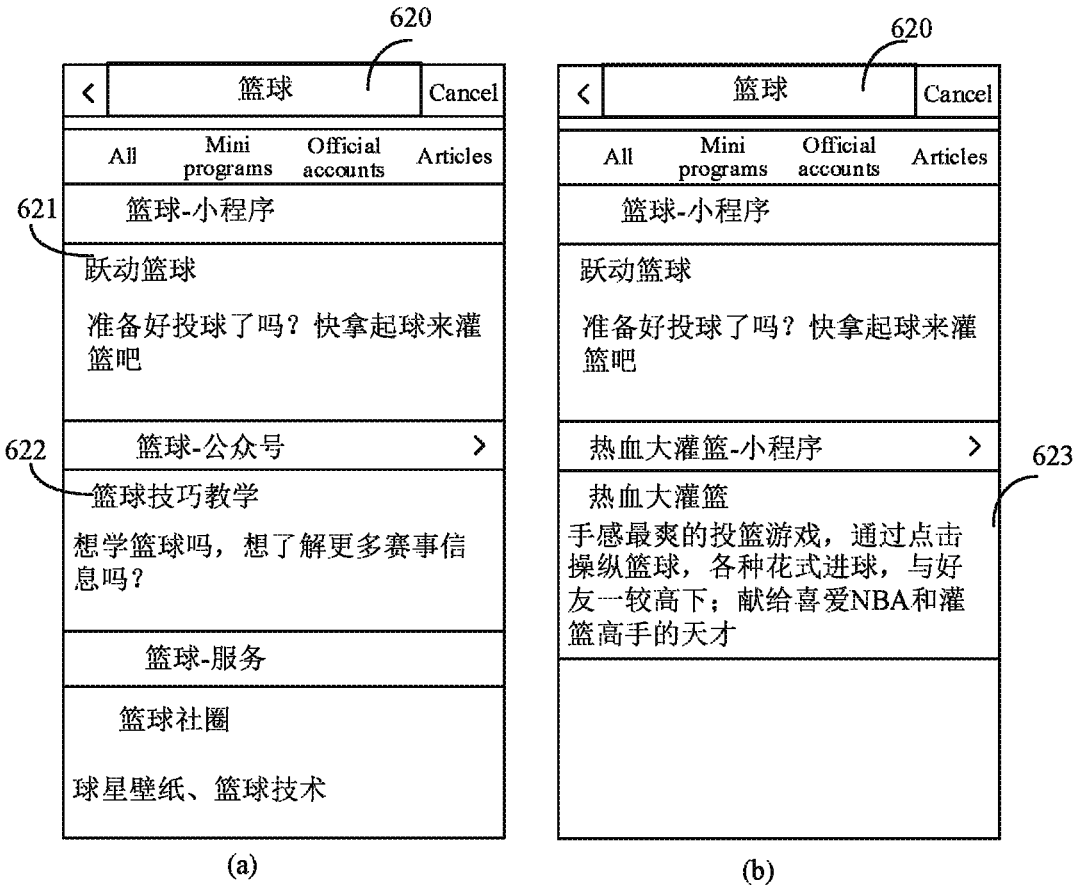
FIG. 10 is a schematic diagram of still another user interface according to some embodiments of this application.

FIG. 10 is a schematic diagram of still another user interface according to some embodiments of this application. As shown in FIG. 10, a user interface a in FIG. 10 is a schematic diagram of application effects of other embodiments. According to the user interface a in FIG. 10, when the user needs to enter a search term "篮球" 620 to search for a mini program of "热血大灌篮", because the name of the mini program of "热血大灌篮" does not include "篮球", the server can only find, based on the search term "篮球" 620, a mini program "跃动篮球" 621 and an official account "篮球技巧教学" 622 having the search term "篮球" 620 appearing in titles, but cannot find the mini program of "热血大灌篮". It may be seen that, the anchor text determined by the related art can only be words appearing in the title, and the keywords that indicate core semantics in the text cannot be extracted as the anchor text. As a result, the terminal device can only display the mini program, the official account and a service whose names include the search term "篮球" 620, but cannot display the mini program of "热血大灌篮".

Furthermore, a user interface b in FIG. 10 is a schematic diagram of an application effect of a keyword extraction method according to embodiments of this application. According to the user interface b in FIG. 10, when the user needs to enter the search term "篮球" 620 to search for the mini program of "热血大灌篮", because a description text of the mini program of "热血大灌篮" is "手感最爽的投篮游戏，通过点击操纵篮球，各种花式进球，与好友一较高下；献给喜爱NBA和灌篮高手的天才", through the keyword extraction method provided by the embodiments of this application, "篮球" may be extracted as a keyword of the description text of the mini program of "热血大灌篮", and the keyword "篮球" is used as an anchor text of the mini program of "热血大灌篮". When the user enters the search term "篮球" 620, the server may determine the anchor text "篮球" of the mini program of "热血大灌篮" through the search term "篮球" 620, then find the mini program of "热血大灌篮", and return the mini program to the terminal device to cause the terminal device to display a mini program 623 of "热血大灌篮" in a search result.

According to the technical solution provided in this application, because the text and the title have the same core semantics, and the keyword extraction method for the text uses structure information of the text and the title, an extracted keyword can reflect core semantics of the text. On the other hand, the keyword extraction method for the text does not need to manually set a threshold, can adaptively adjust a threshold for extracting keywords according to different texts and titles, thereby having relatively good generalization performance, and can provide services for many search scenarios, thereby improving search experience of a user.

Figure 11:
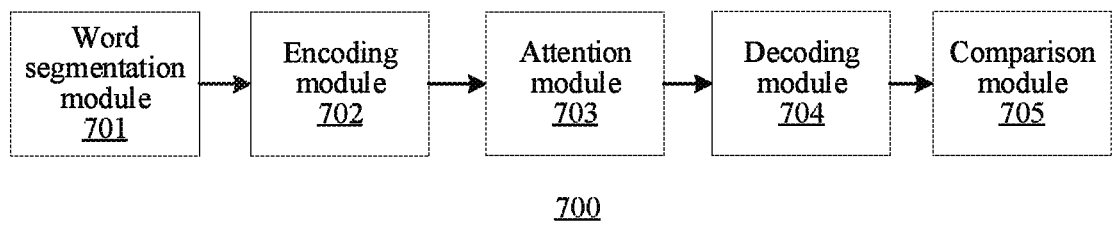
FIG. 11 is a schematic structural diagram of an apparatus for training a keyword extraction model according to some embodiments of this application.

Corresponding to the above method for training a keyword extraction model, this application further provides an apparatus 700 for implementing the foregoing method. FIG. 11 is a schematic structural diagram of an apparatus according to some embodiments of this application. As shown in FIG. 11, the apparatus 700 includes: a word segmentation module 701, an encoding module 702, an attention module 703, a decoding module 704 and a comparison module 705, where the word segmentation module 701 is configured to perform word segmentation on a training text, to obtain a plurality of candidate words; and perform segmentation on a training title with the same semantics as (that is, semantically corresponding to) the training text, to obtain a plurality of characters;

the encoding module 702 is configured to sequentially input the plurality of candidate words to the encoding model, to obtain a text feature representation of each candidate word;

the attention module 703 is configured to adjust the text feature representation of the each candidate word according to an attention weight of the each candidate word; and obtain a text feature representation of the training text according to the adjusted text feature representation of the each candidate word;

the decoding module 704 is configured to input the text feature representation of the training text and the plurality of characters obtained by character segmentation to the decoding model, to obtain a plurality of target characters; and the comparison module 705 is configured to compare the plurality of characters obtained by character segmentation and the plurality of target characters, and respectively adjust an attention weight corresponding to the text feature representation of the each candidate word according to a comparison result.

In some embodiments, the attention module 703 is further configured to perform weighting on the text feature representation of the each candidate word according to the attention weights of the candidate words at different moments; and perform summation on the weighted text feature representation of the each candidate word to obtain the text feature representations of the training text at different moments.

In some embodiments, the comparison module 705 is further configured to:

determine errors between the plurality of characters obtained by character segmentation and the plurality of target characters, and determine a gradient according to the errors, the gradient being used for representing an update direction of the attention weight; and adjust the attention weight corresponding to the text feature representation of the each candidate word according to the determined gradient.

In some embodiments, in a case that the comparison module 705 determines that the plurality of characters obtained by character segmentation are consistent with the plurality of target characters, training of the keyword extraction model is finished.

According to the above apparatus for training a keyword extraction model, on the one hand, there is no need to manually annotate a large quantity of data sets, thereby effectively reducing labor costs. On the other hand, because the text and the title have the same core semantics, the method for training a keyword extraction model uses structure information of the text and the title, and the model obtained by training can distribute an appropriate attention weight to the candidate word in the text, accuracy of keyword extraction is improved.

In some embodiments, a computer device is provided. The computer device includes one or more processors and one or more memories, the one or more memories storing at least one piece of program code, the at least one piece of program code being loaded and executed by the one or more processors to implement the following operations:

performing word segmentation on a training text, to obtain a plurality of candidate words; and performing character segmentation on a training title corresponding to semantics of the training text, to obtain a plurality of characters;

sequentially inputting the plurality of candidate words to an encoding model in a keyword extraction model, to obtain a text feature representation of each candidate word;

adjusting the text feature representation of the each candidate word according to an attention weight of the each candidate word; and obtaining a text feature representation of the training text according to the adjusted text feature representation of the each candidate word;

inputting the text feature representation of the training text and the plurality of characters obtained by character segmentation to a decoding model in the keyword extraction model, to obtain a plurality of target characters; and comparing the plurality of characters obtained by character segmentation and the plurality of target characters, and respectively adjusting an attention weight corresponding to the text feature representation of the each candidate word according to a comparison result.

In some embodiments, the one or more processors are configured to perform the following operations:

performing weighting on the text feature representation of the each candidate word according to the attention weight of the each candidate word; and the obtaining a text feature representation of the training text according to the adjusted text feature representation of the each candidate word includes:

performing summation on the weighted text feature representation of the each candidate word to obtain the text feature representation of the training text.

In some embodiments, the one or more processors are configured to perform the following operations:

determining errors between the plurality of characters obtained by character segmentation and the plurality of target characters, and determining a gradient according to the errors, the gradient being used for representing an update direction of the attention weight; and adjusting the attention weight corresponding to the text feature representation of the each candidate word according to the determined gradient.

In some embodiments, the one or more processors are configured to perform the following operation:

finishing training of the keyword extraction model in a case that the plurality of characters obtained by character segmentation are consistent with the plurality of target characters.

Figure 12:
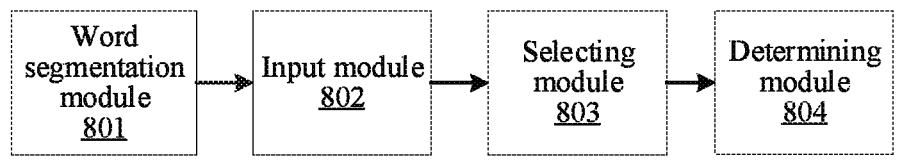
FIG. 12 is a schematic structural diagram of a keyword extraction apparatus according to some embodiments of this application.

Corresponding to the above text keyword extraction method, the embodiments of this application further provide an apparatus 800 for implementing the foregoing method. FIG. 12 is a schematic structural diagram of an apparatus 800 according to some embodiments of this application. As shown in FIG. 12, the apparatus 800 includes: a word segmentation module 801, an input module 802, a selecting module 803 and a determining module 804, where the word segmentation module 801 is configured to perform word segmentation on a text, to obtain a plurality of candidate words; and perform segmentation on a title with the same semantics as (that is, semantically corresponding to) the text, to obtain a plurality of characters;

the input module 802 is configured to sequentially input the plurality of candidate words to a keyword extraction model, to obtain an attention weight of each candidate word relative to each character, the attention weight being used for representing a degree of semantic association between the each candidate word and the each character;

the selecting module 803 is configured to select, from the candidate words, a candidate word that appears in the title; and the determining module 804 is configured to determine an extraction threshold according to an attention weight of the selected candidate word; and determine a keyword of the text from the candidate words according to the extraction threshold.

In some embodiments, the input module 802 is further configured to determine position information of the plurality of candidate words in a preset word list, and separately obtains word vectors of the plurality of candidate words according to the position information of the plurality of candidate words; and sequentially input word vectors of the plurality of candidate words to the keyword extraction model.

In some embodiments, the determining module 804 is further configured to:

for each selected candidate word, select a corresponding weight from attention weights of the candidate word relative to the characters; and determine the extraction threshold according to the weight corresponding to the selected candidate word.

In some embodiments, the corresponding weight is a maximum attention weight among the attention weights of the candidate words relative to the characters.

In some embodiments, the determining module 804 is further configured to determine, for the each selected candidate word, a maximum attention weight among the attention weights of the candidate words relative to the characters as the weight corresponding to the candidate word.

In some embodiments, the determining module 804 is further configured to determine, for the each selected candidate word, an average value of the attention weights of the candidate words relative to the characters as the weight corresponding to the candidate word.

In some embodiments, the determining module 804 is further configured to determine, for each candidate word in the candidate words, in a case that the weight corresponding to the candidate word is greater than the extraction threshold, the candidate word as the keyword of the text.

In some embodiments, the determining module 804 is further configured to determine the extraction threshold according to a maximum weight among the weights corresponding to the selected candidate words.

In some embodiments, the determining module 804 is further configured to determine, for each candidate word in the candidate words, in a case that the weight corresponding to the candidate word is greater than the extraction threshold, the candidate word as the keyword of the text.

In some embodiments, when the determining module 804 determines that the candidate words do not appear in the title, the plurality of candidate words are discarded.

In some embodiments, the determining module 804 further determines the keyword as an anchor text of the text. When the determining module 804 determines that a search term of a user includes the anchor text, the determined text corresponding to the anchor text is fed back to a terminal device, to cause the terminal device to display the text corresponding to the anchor text.

According to the above keyword extraction apparatus, because the text and the title have the same core semantics, and the keyword extraction method for the text uses structure information of the text and the title, an extracted keyword can reflect core semantics of the text. On the other hand, the keyword extraction method for the text does not need to manually set a threshold, can adaptively adjust a threshold for extracting keywords according to different texts and titles, thereby having relatively good generalization performance, and can provide services for many search scenarios, thereby improving search experience of a user.

In some embodiments, a computer device is provided. The computer device includes one or more processors and one or more memories, the one or more memories storing at least one piece of program code, the at least one piece of program code being loaded and executed by the one or more processors to implement the following operations:

performing word segmentation on a text, to obtain a plurality of candidate words; and performing character segmentation on a title corresponding to semantics of the text, to obtain a plurality of characters;

sequentially inputting the plurality of candidate words to a keyword extraction model, to obtain an attention weight of each candidate word relative to each character, the attention weight being used for representing a degree of semantic association between the each candidate word and the each character;

selecting, from the candidate words, a candidate word that appears in the title;

determining an extraction threshold according to an attention weight of the selected candidate word relative to the each character; and determining a keyword of the text from the candidate words according to the extraction threshold.

In some embodiments, the one or more processors are configured to perform the following operations:

determining, for the each candidate word, position information of the candidate word in a preset word list, and obtaining a word vector of the candidate word according to the position information of the candidate word; and sequentially inputting word vectors of the plurality of candidate words to the keyword extraction model.

In some embodiments, the one or more processors are configured to perform the following operations:

determining, for each selected candidate word, a weight corresponding to the candidate word according to the attention weight of the candidate word relative to the each character; and determining the extraction threshold according to the weight corresponding to the each selected candidate word.

In some embodiments, the one or more processors are configured to perform the following operation:

determining, for the each selected candidate word, a maximum attention weight among the attention weights of the candidate words relative to the characters as the weight corresponding to the candidate word.

In some embodiments, the one or more processors are configured to perform the following operation:

determining, for the each selected candidate word, an average value of the attention weights of the candidate words relative to the characters as the weight corresponding to the candidate word.

In some embodiments, the one or more processors are configured to perform the following operation:

determining the extraction threshold according to a maximum weight among the weights corresponding to the selected candidate words.

In some embodiments, the one or more processors are configured to perform the following operation:

determining, for the each candidate word, in a case that the weight corresponding to the candidate word is greater than the extraction threshold, the candidate word as the keyword of the text.

In some embodiments, the one or more processors are configured to perform the following operation:

discarding the plurality of candidate words in a case that the candidate words do not appear in the title.

Figure 13:
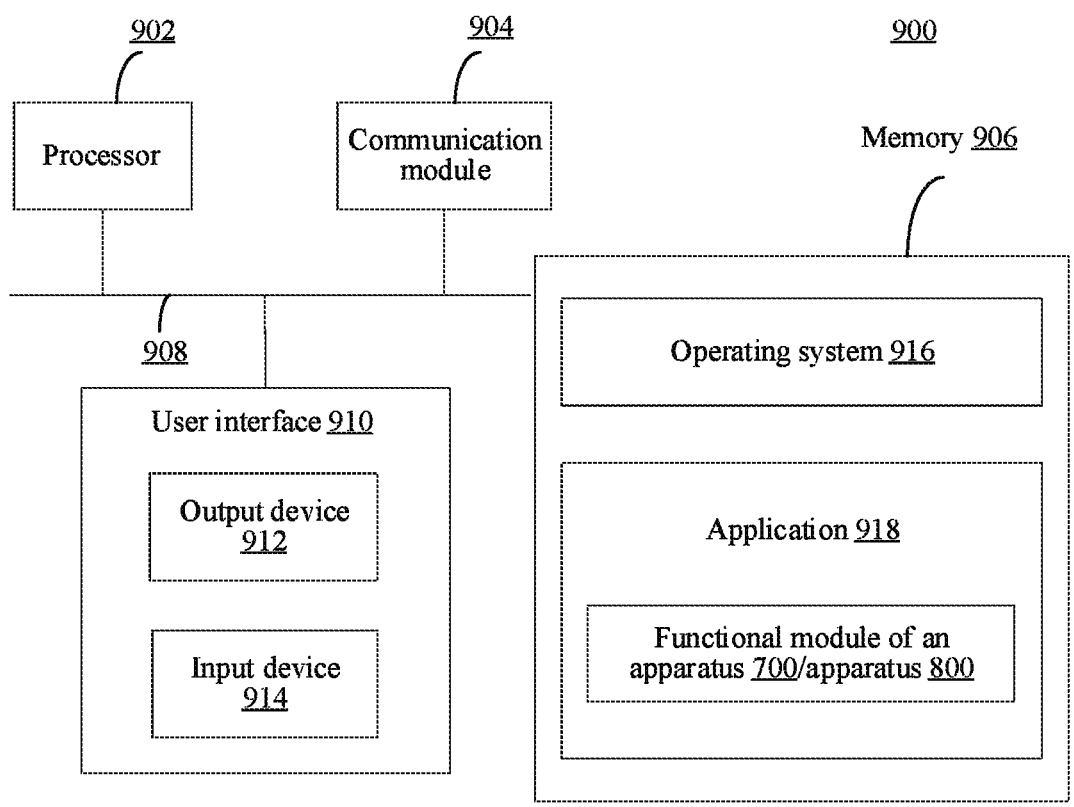
FIG. 13 is a schematic structural diagram of hardware of a computing device according to some embodiments of this application.

FIG. 13 is a structural composition diagram of a computing device for implementing a method for training a keyword extraction model and a text keyword extraction method according to embodiments of this application. The computing device may be an apparatus 700 or apparatus 800. As shown in FIG. 13, the computing device includes one or more processors (Central Processing Unit, CPU) 902, a communication module 904, a memory 906, a user interface 910, and a communication bus 908 for interconnecting these components.

The processor 902 may receive and send data by using the communication module 904 to implement network communication and/or local communication.

The user interface 910 includes one or more output devices 912, including one or more speakers and/or one or more visualization displays. The user interface 910 further includes one or more input devices 914 that include, for example, a keyboard, a mouse, a voice command, an input unit or a microphone, a touchscreen display, a touch-sensitive tablet, a posture capture camera, or other input buttons or controls.

The memory 906 may be a high-speed random access memory such as a dynamic random access memory (DRAM), a static random access memory (SRAM), a double data rate random access memory (DDR RAM), or another random access solid-state storage device; or a non-volatile memory such as one or more magnetic storage devices, an optical disc storage device, a flash memory, or another non-volatile solid-state storage device.

The memory 906 stores an instruction set that can be performed by the processor 902, and includes:

an operating system 916, including a program configured to process various basic system services and execute a hardware-related task; and an application 918, including various application programs for implementing the information processing method. Such application programs can implement a processing flow in each of the foregoing embodiments, and may include, for example, some or all units in the apparatus 700 shown in FIG. 11 or some or all units in the apparatus 800 shown in FIG. 12. At least one of the units or modules 701 to 705 or 801 to 804 may store machine-executable instructions. The processor 902 may implement functions of the at least one of the modules 701 to 705 or 801 to 804 by executing the machine-executable instructions in the at least one of the modules 701 to 705 or 801 to 804 in the memory 906.

Not all steps and modules in the procedures and the structural diagrams are necessary, and some steps or modules may be omitted according to an actual need. An execution sequence of the steps is not fixed and may be adjusted according to needs. Division of the modules is merely functional division for case of description. During actual implementation, one module may be implemented separately by a plurality of modules, and functions of the plurality of modules may alternatively be implemented by the same module. The modules may be located in the same device or in different devices.

A hardware module in each embodiment may be implemented in a hardware manner or in a hardware platform combining with software manner. The software includes a computer-readable instruction, stored in a non-volatile storage medium. Therefore, the embodiments may alternatively be represented as software products.

Therefore, some embodiments of this application further provide a computer-readable storage medium, storing computer instructions, the computer instructions, when executed by a processor, implementing the steps of the method in the foregoing FIG. 3, FIG. 4, FIG. 5 and FIG. 7.

In some embodiments, the computer instructions, when executed by the processor, implement the following operations:
performing word segmentation on a text, to obtain a plurality of candidate words; and performing character segmentation on a title corresponding to semantics of the text, to obtain a plurality of characters;
sequentially inputting the plurality of candidate words to a keyword extraction model, to obtain an attention weight of each candidate word relative to each character, the attention weight being used for representing a degree of semantic association between the each candidate word and the each character;
selecting, from the candidate words, a candidate word that appears in the title;
determining an extraction threshold according to an attention weight of the selected candidate word relative to the each character; and
determining a keyword of the text from the candidate words according to the extraction threshold.

In some embodiments, the computer instructions, when executed by the processor, implement the following operations:
determining, for the each candidate word, position information of the candidate word in a preset word list, and obtaining a word vector of the candidate word according to the position information of the candidate word; and
sequentially inputting word vectors of the plurality of candidate words to the keyword extraction model.

In some embodiments, the computer instructions, when executed by the processor, implement the following operations:
determining, for each selected candidate word, a weight corresponding to the candidate word according to the attention weight of the candidate word relative to the each character; and
determining the extraction threshold according to the weight corresponding to the each selected candidate word.

In some embodiments, the computer instructions, when executed by the processor, implement the following operation:
determining, for the each selected candidate word, a maximum attention weight among the attention weights of the candidate words relative to the characters as the weight corresponding to the candidate word.

In some embodiments, the computer instructions, when executed by the processor, implement the following operation:
determining, for the each selected candidate word, an average value of the attention weights of the candidate words relative to the characters as the weight corresponding to the candidate word.

In some embodiments, the computer instructions, when executed by the processor, implement the following operation:
determining the extraction threshold according to a maximum weight among the weights corresponding to the selected candidate words.

In some embodiments, the computer instructions, when executed by the processor, implement the following operation:
determining, for the each candidate word, in a case that the weight corresponding to the candidate word is greater than the extraction threshold, the candidate word as the keyword of the text.

In some embodiments, the computer instructions, when executed by the processor, implement the following operation:
discarding the plurality of candidate words in a case that the candidate words do not appear in the title.

Some embodiments of this application further provide a computer-readable storage medium, storing computer instructions, the computer instructions, when executed by a processor, implementing the following operations:
performing word segmentation on a training text, to obtain a plurality of candidate words; and performing character segmentation on a training title corresponding to semantics of the training text, to obtain a plurality of characters;
sequentially inputting the plurality of candidate words to an encoding model in a keyword extraction model, to obtain a text feature representation of each candidate word;
adjusting the text feature representation of the each candidate word according to an attention weight of the each candidate word; and obtaining a text feature representation of the training text according to the adjusted text feature representation of the each candidate word;
inputting the text feature representation of the training text and the plurality of characters obtained by character segmentation to a decoding model in the keyword extraction model, to obtain a plurality of target characters; and
comparing the plurality of characters obtained by character segmentation and the plurality of target characters, and respectively adjusting an attention weight corresponding to the text feature representation of the each candidate word according to a comparison result.

In some embodiments, the computer instructions, when executed by the processor, implement the following operations:
performing weighting on the text feature representation of the each candidate word according to the attention weight of the each candidate word; and
the obtaining a text feature representation of the training text according to the adjusted text feature representation of the each candidate word includes:
performing summation on the weighted text feature representation of the each candidate word to obtain the text feature representation of the training text.

In some embodiments, the computer instructions, when executed by the processor, implement the following operations:
determining errors between the plurality of characters obtained by character segmentation and the plurality of target characters, and determining a gradient according to the errors, the gradient being used for representing an update direction of the attention weight; and adjusting the attention weight corresponding to the text feature representation of the each candidate word according to the determined gradient.

In some embodiments, the computer instructions, when executed by the processor, implement the following operation:

finishing training of the keyword extraction model in a case that the plurality of characters obtained by character segmentation are consistent with the plurality of target characters.

In the embodiments, the hardware may be implemented by dedicated hardware or hardware executing the computer-readable instructions. For example, the hardware may be a specially designed permanent circuit or logical device, for example, a special-purpose processor such as a field-programmable gate array (FPGA) or an application-specific integrated circuit (ASIC) for implementing a specific operation. The hardware may alternatively include a programmable logical device or circuit (for example, including a general processor or another programmable processor) configured temporarily by software and configured to perform a specific operation.

In addition, each embodiment of this application may be implemented by a data processing program executed by a data processing device such as a computer. Apparently, the data processing program constitutes this application. In addition, generally the data processing program stored in a storage medium is executed by directly reading the program from the storage medium or by installing or copying the program to a storage device (such as a hard disk or memory) of the data processing device. Therefore, such a storage medium also constitutes this application. This application further provides a non-volatile storage medium storing a data processing program. The data processing program may be used for performing any one of the foregoing embodiments of this application.

The computer-readable instruction corresponding to the modules in FIG. 11 and FIG. 12 may enable an operating system and the like operated on a computer to complete some or all of the operations described herein. The non-volatile computer-readable storage medium may be inserted into a memory disposed in an extension board within a computer or written to a memory disposed in an extension unit connected to the computer. A central processing unit (CPU) or the like installed on the expansion board or the expansion unit may perform some and all actual operations according to an instruction.

In addition, apparatuses and modules in the embodiments of this application may be integrated into one processing unit, or each of the modules may exist alone physically, or two or more apparatuses or modules may be integrated into one unit. The foregoing integrated unit may be implemented in the form of hardware, or may be implemented in the form of a software function unit.

The foregoing descriptions are merely embodiments of this application, but are not intended to limit this application. Any modification, equivalent replacement, or improvement made without departing from the spirit and principle of this application is to fall within the protection scope of this application.

What is claimed is:

1. A method for extracting a keyword from a text performed at a computer device, the method comprising:
   receiving an information entity, the information entity including a text and a title associated with the text;
   performing word segmentation on the text, to obtain a plurality of candidate words, wherein each candidate word has an attention weight that represents a degree of semantic association between the candidate word and the title;
   selecting, from the plurality of candidate words, a candidate word that appears in the title and has a higher attention weight than that of any other candidate word that appears in the title;
   determining an extraction threshold according to the attention weight of the selected candidate word relative to the title;
   determining, for the information entity, a keyword of the text from the plurality of candidate words according to the extraction threshold, wherein an attention weight of the keyword of the text is greater than the extraction threshold and the keyword of the text does not appear in the title;
   storing the determined keyword of the text as anchor text of the information entity;
   receiving a search term submitted by a user from a terminal device; and
   returning the information entity to the terminal device as a search result when the search term matches the anchor text of the information entity for display to the user at the terminal device.

2. The method according to claim 1, wherein the determining an extraction threshold according to an attention weight of the selected candidate word relative to the title comprises:
   determining, for each selected candidate word, a weight corresponding to the candidate word according to the attention weight of the candidate word relative to a character in the title; and
   determining the extraction threshold according to the weight corresponding to the selected candidate word.

3. The method according to claim 2, wherein the determining, for each selected candidate word, a weight corresponding to the candidate word according to the attention weight of the candidate word relative to a character in the title comprises:
   determining, for the selected candidate word, a maximum attention weight among the attention weights of the plurality of candidate words relative to the character as the weight corresponding to the selected candidate word.

4. The method according to claim 2, wherein the determining, for each selected candidate word, a weight corresponding to the candidate word according to the attention weight of the candidate word relative to a character in the title comprises:
   determining, for the selected candidate word, an average value of the attention weights of the plurality of candidate words relative to the character as the weight corresponding to the selected candidate word.

5. The method according to claim 1, wherein no keyword of the text exists when none of the plurality of candidate words appear in the title.

6. The method according to claim 1, wherein the attention weight of each candidate word is obtained by a keyword extraction model including an encoding model and a decoding model.

7. A computer device, comprising one or more processors and one or more memories, the one or more memories storing at least one piece of program code, the at least one piece of program code being loaded and executed by the one or more processors to perform a method for extracting a keyword from a text including:

receiving an information entity, the information entity including a text and a title associated with the text;

performing word segmentation on the text, to obtain a plurality of candidate words, wherein each candidate word has an attention weight that represents a degree of semantic association between the candidate word and the title;

selecting, from the plurality of candidate words, a candidate word that appears in the title and has a higher attention weight than that of any other candidate word that appears in the title;

determining an extraction threshold according to an attention weight of the selected candidate word relative to the title;

determining, for the information entity, a keyword of the text from the plurality of candidate words according to the extraction threshold, wherein the attention weight of the keyword of the text is greater than the extraction threshold and the keyword of the text does not appear in the title;

storing the determined keyword of the text as anchor text of the information entity;

receiving a search term submitted by a user from a terminal device; and returning the information entity to the terminal device as a search result when the search term matches the anchor text of the information entity for display to the user at the terminal device.

8. The computer device according to claim 7, wherein the determining an extraction threshold according to an attention weight of the selected candidate word relative to the title comprises:

determining, for each selected candidate word, a weight corresponding to the candidate word according to the attention weight of the candidate word relative to a character in the title; and determining the extraction threshold according to the weight corresponding to the selected candidate word.

9. The computer device according to claim 8, wherein the determining, for each selected candidate word, a weight corresponding to the candidate word according to the attention weight of the candidate word relative to a character in the title comprises:

determining, for the selected candidate word, a maximum attention weight among the attention weights of the plurality of candidate words relative to the character as the weight corresponding to the selected candidate word.

10. The computer device according to claim 8, wherein the determining, for each selected candidate word, a weight corresponding to the candidate word according to the attention weight of the candidate word relative to a character in the title comprises:

determining, for the selected candidate word, an average value of the attention weights of the plurality of candidate words relative to the character as the weight corresponding to the selected candidate word.

11. The computer device according to claim 7, wherein no keyword of the text exists when none of the plurality of candidate words appear in the title.

12. The computer device according to claim 7, wherein the attention weight of each candidate word is obtained by a keyword extraction model including an encoding model and a decoding model.

13. A non-transitory computer-readable storage medium, storing computer-readable instructions that, when executed by a processor of a computer device, cause the computer device to perform a method for extracting a keyword from a text including:

receiving an information entity, the information entity including a text and a title associated with the text;

performing word segmentation on the text, to obtain a plurality of candidate words, wherein each candidate word has an attention weight that represents a degree of semantic association between the candidate word and the title;

selecting, from the plurality of candidate words, a candidate word that appears in the title and has a higher attention weight than that of any other candidate word that appears in the title;

determining an extraction threshold according to the attention weight of the selected candidate word relative to the title;

determining, for the information entity, a keyword of the text from the plurality of candidate words according to the extraction threshold, wherein an attention weight of the keyword of the text is greater than the extraction threshold and the keyword of the text does not appear in the title;

storing the determined keyword of the text as anchor text of the information entity;

receiving a search term submitted by a user from a terminal device; and returning the information entity to the terminal device as a search result when the search term matches the anchor text of the information entity for display to the user at the terminal device.

14. The non-transitory computer-readable storage medium according to claim 13, wherein the determining an extraction threshold according to an attention weight of the selected candidate word relative to the title comprises:

determining, for each selected candidate word, a weight corresponding to the candidate word according to the attention weight of the candidate word relative to a character in the title; and determining the extraction threshold according to the weight corresponding to the selected candidate word.

15. The non-transitory computer-readable storage medium according to claim 14, wherein the determining, for each selected candidate word, a weight corresponding to the candidate word according to the attention weight of the candidate word relative to a character in the title comprises:

determining, for the selected candidate word, a maximum attention weight among the attention weights of the plurality of candidate words relative to the character as the weight corresponding to the selected candidate word.

16. The non-transitory computer-readable storage medium according to claim 14, wherein the determining, for each selected candidate word, a weight corresponding to the candidate word according to the attention weight of the candidate word relative to a character in the title comprises:

determining, for the selected candidate word, an average value of the attention weights of the plurality of candidate words relative to the character as the weight corresponding to the selected candidate word.

17. The non-transitory computer-readable storage medium according to claim 13, wherein no keyword of the text exists when none of the plurality of candidate words appear in the title.

* * * * *